US012511952B1

(12) United States Patent
MacDonald

(10) Patent No.: US 12,511,952 B1
(45) Date of Patent: Dec. 30, 2025

(54) METHODS FOR VEHICLE CATEGORY IDENTIFICATION IN A TELEMATICS SYSTEM

(71) Applicant: Geotab Inc., Oakville (CA)

(72) Inventor: Ryan Andrew MacDonald, Maryland (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/087,687

(22) Filed: Mar. 24, 2025

Related U.S. Application Data

(60) Provisional application No. 63/709,006, filed on Oct. 18, 2024.

(51) Int. Cl.
*G07C 5/00* (2006.01)

(52) U.S. Cl.
CPC ................... *G07C 5/008* (2013.01)

(58) Field of Classification Search
CPC .................................................... G07C 5/008
USPC ....................................................... 701/29.1
See application file for complete search history.

(56) References Cited

U.S. PATENT DOCUMENTS

| | | | |
|---|---|---|---|
| 6,512,465 B2 | 1/2003 | Flick | |
| 6,741,187 B2 | 5/2004 | Flick | |
| 6,744,384 B2 | 6/2004 | Flick | |
| 6,756,885 B1 | 6/2004 | Flick | |
| 6,784,809 B2 | 8/2004 | Flick | |
| 6,798,356 B2 | 9/2004 | Flick | |
| 6,803,861 B2 | 10/2004 | Flick | |
| 6,888,495 B2 | 5/2005 | Flick | |
| 6,957,133 B1* | 10/2005 | Hunt | B60R 25/302 701/32.7 |
| 6,972,667 B2 | 12/2005 | Flick | |
| 7,257,396 B2 | 8/2007 | Olsen et al. | |
| 7,647,147 B2 | 1/2010 | Fortin et al. | |
| 7,671,727 B2 | 3/2010 | Flick | |
| 8,032,278 B2 | 10/2011 | Flick | |
| 9,754,426 B2 | 9/2017 | Meyer et al. | |
| 9,779,562 B1 | 10/2017 | Cook et al. | |
| 9,886,800 B2 | 2/2018 | Groß | |
| 10,255,575 B2 | 4/2019 | Warkentin et al. | |
| 10,572,542 B1 | 2/2020 | Conner | |
| 10,580,238 B1* | 3/2020 | Sohn | G07C 9/00309 |
| 11,140,236 B2 | 10/2021 | Davis et al. | |
| 11,222,489 B2 | 1/2022 | Amendolagine et al. | |
| 11,310,069 B2 | 4/2022 | Xiao et al. | |
| 11,494,281 B1* | 11/2022 | Fox | G06F 11/0772 |
| 11,542,001 B1 | 1/2023 | Parodi et al. | |
| 11,710,355 B1* | 7/2023 | Wenneman | H04L 67/141 701/29.3 |
| 11,736,312 B1 | 8/2023 | Xiao et al. | |
| 11,741,760 B1 | 8/2023 | Dubin et al. | |
| 11,748,377 B1 | 9/2023 | Zhang et al. | |
| 11,756,346 B1 | 9/2023 | Wu et al. | |

(Continued)

*Primary Examiner* — Tyler D Paige
(74) *Attorney, Agent, or Firm* — Sherif A. Abdel-Kader

(57) ABSTRACT

A method in a telematics system is provided. The method is for identifying an asset category of a plurality of asset categories. The method includes executing category identifying asset data queries after excluding error causing asset data requests from a main list and excluding asset categories from the main list based on the result of executing category identifying vehicle data queries. The steps are repeated until a single asset category remains in the main list.

15 Claims, 21 Drawing Sheets

(56) References Cited

U.S. PATENT DOCUMENTS

| | | | |
|---|---|---|---|
| 11,780,446 B1* | 10/2023 | Srinivasan | B60W 40/08 |
| | | | 701/1 |
| 11,787,413 B2 | 10/2023 | Tsai et al. | |
| 11,847,911 B2* | 12/2023 | ElHattab | G08G 1/09623 |
| 11,977,427 B2* | 5/2024 | Fox | G06F 1/266 |
| 12,211,009 B2* | 1/2025 | Kleinhans | G06Q 10/20 |
| 2008/0147245 A1* | 6/2008 | Koepf | G06F 11/25 |
| | | | 701/1 |
| 2016/0244067 A1* | 8/2016 | Hunt | B60W 30/143 |
| 2018/0182182 A1 | 6/2018 | Meyer et al. | |
| 2020/0198651 A1* | 6/2020 | Levy | G06N 20/00 |
| 2021/0241138 A1* | 8/2021 | Meroux | G06Q 10/20 |
| 2022/0014601 A1 | 1/2022 | Davis et al. | |
| 2022/0044500 A1 | 2/2022 | Yang et al. | |
| 2022/0237958 A1* | 7/2022 | Tzamaloukas | G07C 5/08 |
| 2023/0171314 A1 | 6/2023 | Onti Srinivasan et al. | |
| 2023/0421930 A1* | 12/2023 | Ghulamali | B60Q 9/00 |
| 2024/0203168 A1* | 6/2024 | Starkey | G08G 1/096725 |

\* cited by examiner

| Category Identifying Vehicle Data Query | Result on c1 | Result on c2 | Result on c3 | Result on c4 |
|---|---|---|---|---|
| a1 | 1 | 0 | E | 0 |
| a2 | E | 1 | 0 | 1 |
| a3 | 1 | 1 | 1 | 0 |
| a4 | E | 1 | 0 | 1 |
| a5 | 0 | 0 | E | 1 |
| a6 | 0 | 1 | 1 | 1 |
| a7 | 0 | 1 | E | 0 |
| a8 | 1 | 1 | 0 | 1 |
| a9 | 1 | 0 | 0 | 1 |
| a10 | 1 | 0 | E | 0 |

FIG. 9

| Info Vehicle Data Query | Category c1 | Category c2 | Category c3 | Category c4 |
|---|---|---|---|---|
| a11 | | Odometer | Odometer | |
| a12 | Odometer | | | Odometer |
| a13 | Fuel Level | | Fuel Level | |
| a14 | Ignition | | | Ignition |
| a15 | Gear | | | |
| a16 | Parking Brake | | | |
| a17 | Seatbelt | Fuel Level | | Fuel Level |
| a18 | | Ignition | | |
| a19 | | Gear | | |
| a20 | | Parking Brake | | |
| a21 | | Seatbelt | | Seatbelt |
| a22 | | | | |
| a23 | | | Ignition | |
| a24 | | | Gear | Gear |
| a25 | | | Parking Brake | Parking Brake |
| a26 | | | | |

FIG. 10

| Category Identifying Vehicle Data Query | Result on c1 | Result on c2 | Result on c3 | Result on c4 |
|---|---|---|---|---|
| a1 | 1 | 0 | E | 0 |
| a2 | E | 1 | 0 | 1 |
| a3 | 1 | 1 | 1 | 0 |
| a4 | E | 1 | 0 | 1 |
| a5 | 0 | 0 | E | 1 |
| a6 | 0 | 1 | 1 | 1 |
| a7 | 0 | 1 | E | 0 |
| a8 | 1 | 1 | 0 | 1 |
| a9 | 1 | 0 | 0 | 1 |
| a10 | 1 | 0 | E | 0 |

| Category Identifying Vehicle Data Query | Result on c1 | Result on c2 | Result on c3 | Result on c4 |
|---|---|---|---|---|
| a3 | 1 | 1 | 1 | 0 |
| a6 | 0 | 1 | 1 | 1 |
| a8 | 1 | 1 | 0 | 1 |
| a9 | 1 | 0 | 0 | 1 |

| Category Identifying Vehicle Data Query | Result on c1 | Result on c2 | Result on c3 | Result on c4 |
|---|---|---|---|---|
| a1 | 1 | 0 | E | 0 |
| a2 | E | 1 | 0 | 1 |
| a3 | 1 | 1 | 1 | 0 |
| a4 | E | 1 | 0 | 1 |
| a5 | 0 | 0 | E | 1 |
| a6 | 0 | 1 | 1 | 1 |
| a7 | 0 | 1 | E | 0 |
| a8 | 1 | 1 | 0 | 1 |
| a9 | 1 | 0 | 0 | 1 |
| a10 | 1 | 0 | E | 0 |

| Category Identifying Vehicle Data Query | Result on c1 | Result on c4 |
|---|---|---|
| a1 | 1 | 0 |
| a2 | E | 1 |
| a3 | 1 | 0 |
| a4 | E | 1 |
| a5 | 0 | 1 |
| a6 | 0 | 1 |
| a7 | 0 | 0 |
| a8 | 1 | 1 |
| a9 | 1 | 1 |
| a10 | 1 | 0 |

900 →

| Category Identifying Vehicle Data Query | Result on c1 | Result on c4 |
|---|---|---|
| a1 | 1 | 0 |
| a2 | E | 1 |
| a3 | 1 | 0 |
| a4 | E | 1 |
| a5 | 0 | 1 |
| a6 | 0 | 1 |
| a7 | 0 | 0 |
| a8 | 1 | 1 |
| a9 | 1 | 1 |
| a10 | 1 | 0 |

| Category Identifying Vehicle Data Query | Result on c1 | Result on c4 |
|---|---|---|
| a1 | 1 | 0 |
| a3 | 1 | 0 |
| a5 | 0 | 1 |
| a6 | 0 | 1 |
| a7 | 0 | 0 |
| a8 | 1 | 1 |
| a9 | 1 | 1 |
| a10 | 1 | 0 |

| Category Identifying Vehicle Data Query | Result on c1 | Result on c4 |
|---|---|---|
| a1 | 1 | 0 |
| a3 | 1 | 0 |
| a5 | 0 | 1 |
| a6 | 0 | 1 |
| a7 | 0 | 0 |
| a8 | 1 | 1 |
| a9 | 1 | 1 |
| a10 | 1 | 0 |

| Category Identifying Vehicle Data Query | Result on c1 |
|---|---|
| a1 | 1 |
| a3 | 1 |
| a5 | 0 |
| a6 | 0 |
| a7 | 0 |
| a8 | 1 |
| a9 | 1 |
| a10 | 1 |

| Category Identifying Vehicle Data Query | Result on c1 | Result on c4 |
|---|---|---|
| a1 | 1 | 0 |
| a3 | 1 | 0 |
| a5 | 0 | 1 |
| a6 | 0 | 1 |
| a7 | 0 | 0 |
| a8 | 1 | 1 |
| a9 | 1 | 1 |
| a10 | 1 | 0 |

| Category Identifying Vehicle Data Query | Result on c4 |
|---|---|
| a1 | 0 |
| a3 | 0 |
| a5 | 1 |
| a6 | 1 |
| a7 | 0 |
| a8 | 1 |
| a9 | 1 |
| a10 | 0 |

| Category Identifying Vehicle Data Query | Result on c1 | Result on c2 | Result on c3 | Result on c4 |
|---|---|---|---|---|
| a1 | 1 | 0 | E | 0 |
| a2 | E | 1 | 0 | 1 |
| a3 | 1 | 1 | 1 | 0 |
| a4 | E | 1 | 0 | 1 |
| a5 | 0 | 0 | E | 1 |
| a6 | 0 | 1 | 1 | 1 |
| a7 | 0 | 1 | E | 0 |
| a8 | 1 | 1 | 0 | 1 |
| a9 | 1 | 0 | 0 | 1 |
| a10 | 1 | 0 | E | 0 |

| Category Identifying Vehicle Data Query | Result on c2 | Result on c3 |
|---|---|---|
| a1 | 0 | E |
| a2 | 1 | 0 |
| a3 | 1 | 1 |
| a4 | 1 | 0 |
| a5 | 0 | E |
| a6 | 1 | 1 |
| a7 | 1 | E |
| a8 | 1 | 0 |
| a9 | 0 | 0 |
| a10 | 0 | E |

| Category Identifying Vehicle Data Query | Result on c2 | Result on c3 |
|---|---|---|
| a1 | 0 | E |
| a2 | 1 | 0 |
| a3 | 1 | 1 |
| a4 | 1 | 0 |
| a5 | 0 | E |
| a6 | 1 | 1 |
| a7 | 1 | E |
| a8 | 1 | 0 |
| a9 | 0 | 0 |
| a10 | 0 | E |

| Category Identifying Vehicle Data Query | Result on c2 | Result on c3 |
|---|---|---|
| a2 | 1 | 0 |
| a3 | 1 | 1 |
| a4 | 1 | 0 |
| a6 | 1 | 1 |
| a7 | 1 | E |
| a8 | 1 | 0 |
| a9 | 0 | 0 |

| Category Identifying Vehicle Data Query | Result on c2 | Result on c3 |
|---|---|---|
| a2 | 1 | 0 |
| a3 | 1 | 1 |
| a4 | 1 | 0 |
| a6 | 1 | 1 |
| a7 | 1 | E |
| a8 | 1 | 0 |
| a9 | 0 | 0 |

| Category Identifying Vehicle Data Query | Result on c2 |
|---|---|
| a2 | 1 |
| a3 | 1 |
| a4 | 1 |
| a6 | 1 |
| a7 | 1 |
| a8 | 1 |
| a9 | 0 |

| Category Identifying Vehicle Data Query | Result on c2 | Result on c3 |
|---|---|---|
| a2 | 1 | 0 |
| a3 | 1 | 1 |
| a4 | 1 | 0 |
| a6 | 1 | 1 |
| a7 | 1 | E |
| a8 | 1 | 0 |
| a9 | 0 | 0 |

| Category Identifying Vehicle Data Query | Result on c3 |
|---|---|
| a2 | 0 |
| a3 | 1 |
| a4 | 0 |
| a6 | 1 |
| a7 | E |
| a8 | 0 |
| a9 | 0 |

FIG. 22B

METHODS FOR VEHICLE CATEGORY IDENTIFICATION IN A TELEMATICS SYSTEM

RELATED APPLICATIONS

This application claims priority from U.S. provisional application 63/709,006 filed 18 Oct. 2024, the contents of which are herein incorporated by reference in their entirety.

FIELD

The present disclosure generally relates to vehicle telematics, and more specifically to methods for vehicle category identification in a telematics system.

BACKGROUND

A telematics system may gather asset data using a telematics device. The telematics device may be integrated into or located onboard the asset. The asset may be a vehicle ("vehicular asset") or some other stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In some aspects of the present disclosure, the techniques described herein relate to a method in a telematics system, including: from a main list associated with a telematics server, the main list including a plurality of category identifying asset data queries and corresponding expected results of executing the category identifying asset data queries on each of a plurality of asset categories: (i) identifying, by the telematics server, a plurality of error causing category identifying asset data requests in the main list; (ii) creating, by the telematics server, a temporary list containing elements of the main list excluding the plurality of error causing category identifying asset data requests and corresponding expected results of executing the error causing category identifying asset data requests; (iii) selecting, by the telematics server, from the temporary list, a category identifying asset data query for execution; (iv) sending, by the telematics server, the selected category identifying asset data query, over a network, to a telematics device coupled to an asset; (v) executing, by the telematics device, the category identifying asset data query; (vi) sending, by the telematics device, over the network, a result of executing the selected category identifying vehicle data query to the telematics server; (vii) identifying, by the telematics server, one or more asset categories to be removed from the main list based on a result of executing the category identifying asset data query; (viii) removing, by the telematics server, asset categories identified for removal; and (ix) repeating steps i) through viii) until there is a single asset data category in the main list; determining, by the telematics server, an asset category of the asset to be the asset category corresponding to the single asset data category; sending, by the telematics server, over the network, the determined asset category of the asset to the telematics device; and executing, by the telematics device, at least one information asset data queries, based on the asset category of the asset, by the telematics device, for obtaining information from the asset without causing operational interference.

In some aspects, the techniques described herein relate to a method, wherein the plurality of error causing category identifying asset data requests in the main list includes identifying category identifying asset data queries each having a corresponding expected result of executing that indicates an error.

In some aspects, the techniques described herein relate to a method, further including sending, by the telematics device, the obtained information to the telematics server.

In some aspects, the techniques described herein relate to a method, wherein executing the selected category identifying asset data query by the telematics device includes listening for broadcast data messages on an asset communications bus of the asset.

In some aspects, the techniques described herein relate to a method, wherein executing the selected category identifying asset data query by the telematics device includes placing an asset data request on an asset communications bus of the asset and receiving an asset data response corresponding to the asset data request.

In some aspects, the techniques described herein relate to a method in a telematics system, including: from a main table stored in a telematics database coupled to a telematics server, the main table including a first plurality of rows each including a category identifying vehicle data query and corresponding expected results of executing the category identifying vehicle data query on each of a plurality of vehicle categories: (i) identifying, by the telematics server, a second plurality of rows each containing an error causing category identifying vehicle data request; (ii) creating, by the telematics server, a temporary table containing the first plurality of rows but excluding the second plurality of rows; (iii) selecting, by the telematics server from the temporary table, a row containing a selected category identifying vehicle data query for execution; (iv) sending, by the telematics server, the selected category identifying vehicle data query, over a network, to a telematics device coupled to a vehicle; (v) executing, by the telematics device, the selected category identifying vehicle data query; (vi) sending, by the telematics device, over the network, a result of executing the selected category identifying vehicle data query to the telematics server; (vii) identifying, by the telematics server, at least one vehicle category to be excluded from the main table based on a result of executing the selected category identifying vehicle data query; (viii) removing, by the telematics server, at least one column corresponding to the at least one vehicle category from the main table; and (ix) repeating steps i) through viii) until there is a single column in the main table; determining, by the telematics server, a vehicle category of the vehicle to be the vehicle category corresponding to the single column; sending, by the telematics server, over the network, the determined vehicle category of the vehicle to the telematics device; and executing, by the telematics device, at least one information vehicle data queries, based on the vehicle category of the vehicle, by the telematics device, for obtaining information from the vehicle without causing operational interference.

In some aspects, the techniques described herein relate to a method, wherein identifying the second plurality of rows includes identifying rows wherein the corresponding expected results of executing the category identifying vehicle data query indicates an error.

In some aspects, the techniques described herein relate to a method, further including sending, by the telematics device, the obtained information to the telematics server.

In some aspects, the techniques described herein relate to a method, wherein executing the selected category identifying vehicle data query by the telematics device includes listening for broadcast data messages on an asset communications bus of the vehicle.

In some aspects, the techniques described herein relate to a method, wherein executing the selected category identifying vehicle data query by the telematics device includes placing a vehicle data request on an asset communications bus of the vehicle and receiving a vehicle data response corresponding to the vehicle data request.

In some aspects, the techniques described herein relate to a telematics system, including: a telematics server; a telematics database coupled to the telematics server; a network; and a telematics device in communication with the telematics server over the network; wherein from a main list associated with a telematics server, the main list including a plurality of category identifying asset data queries and corresponding expected results of executing the category identifying asset data queries on each of a plurality of asset categories: (i) the telematics server identifies a plurality of error causing category identifying asset data requests in the main list; (ii) the telematics server creates a temporary list containing elements of the main list excluding the plurality of error causing category identifying asset data requests and corresponding expected results of executing the error causing category identifying asset data requests; (iii) the telematics server selects from the temporary list, a category identifying asset data query for execution; (iv) the telematics server sends the selected category identifying asset data query, over a network, to a telematics device coupled to an asset; (v) the telematics device executes the category identifying asset data query; (vi) the telematics device sends over the network, a result of executing the selected category identifying vehicle data query to the telematics server; (vii) the telematics server identifies one or more asset categories to be removed from the main list based on a result of executing the category identifying asset data query; (viii) the telematics server removes asset categories identified for removal; and (ix) the steps i) through viii) are repeated until there is a single asset data category in the main list; telematics server determines an asset category of the asset to be the asset category corresponding to the single asset data category; the telematics server sends, over the network, the determined asset category of the asset to the telematics device; and the telematics device executes at least one information asset data queries, based on the asset category of the asset, by the telematics device, for obtaining information from the asset without causing operational interference.

In some aspects, the techniques described herein relate to a telematics system, wherein the telematics device sends the obtained information to the telematics server.

In some aspects, the techniques described herein relate to a telematics system, wherein the telematics device executes the selected category identifying vehicle data query by listening for broadcast data messages on an asset communications bus of the vehicle.

In some aspects, the techniques described herein relate to a telematics system, wherein the telematics device executes the selected category identifying vehicle data query by placing an asset data request on an asset communications bus of the asset and receiving an asset data response corresponding to the asset data request.

In some aspects, the techniques described herein relate to a telematics system, wherein the telematics server identifies the second plurality of rows by identifying rows wherein the corresponding expected results of executing the category identifying vehicle data query indicates an error.

BRIEF DESCRIPTION OF THE DRAWINGS

Exemplary non-limiting embodiments of the present invention are described with reference to the accompanying drawings in which:

FIG. 9 is a main table containing a plurality of category identifying vehicle data queries and their expected results on each of a plurality of vehicle categories;

FIG. 10 is a table containing a plurality of information vehicle data queries that capture specific information from vehicles of each category of a plurality of vehicle categories;

FIG. 15A depicts the main table of FIG. 13B with the rows containing error causing vehicle data requests shaded;

FIG. 15B depicts a temporary table based on the main table of FIG. 15A with the shaded rows from FIG. 15A removed and with a vehicle data query selected for execution identified;

FIG. 16A depicts the main table of FIG. 13B with one column shaded for removal based on the positive outcome of executing the query selected in FIG. 15B;

FIG. 16B depicts the main table of FIG. 16A with the shaded column removed;

FIG. 17A depicts the main table of FIG. 13B with one column shaded for removal based on the negative outcome of executing the query selected in FIG. 15B;

FIG. 17B depicts the main table of FIG. 17A with the shaded column removed;

FIG. 19A depicts the main table of FIG. 9 with some columns corresponding to vehicle categories shaded to indicate their imminent removal therefrom as a result of receiving a negative result from executing the vehicle data query selected for execution in FIG. 12B;

FIG. 19B depicts the main table of FIG. 19A with the shaded columns removed;

FIG. 20A depicts the main table of FIG. 19B with the rows containing error causing vehicle data requests shaded;

FIG. 20B depicts a temporary table based on the main table of FIG. 20A with the shaded rows from FIG. 20A removed and with a vehicle data query selected for execution identified;

FIG. 21A depicts the main table of FIG. 20A with a column shaded based on a positive outcome of executing the vehicle data query selected in FIG. 20B;

FIG. 21B depicts the main table of FIG. 21A with the shaded column removed;

FIG. 22A depicts the main table of FIG. 20A with a column shaded based on a negative outcome of executing the vehicle data query selected in FIG. 20B;

FIG. 22B depicts the main table of FIG. 22A with the shaded column removed;

DETAILED DESCRIPTION

Telematics System

Figure 1:
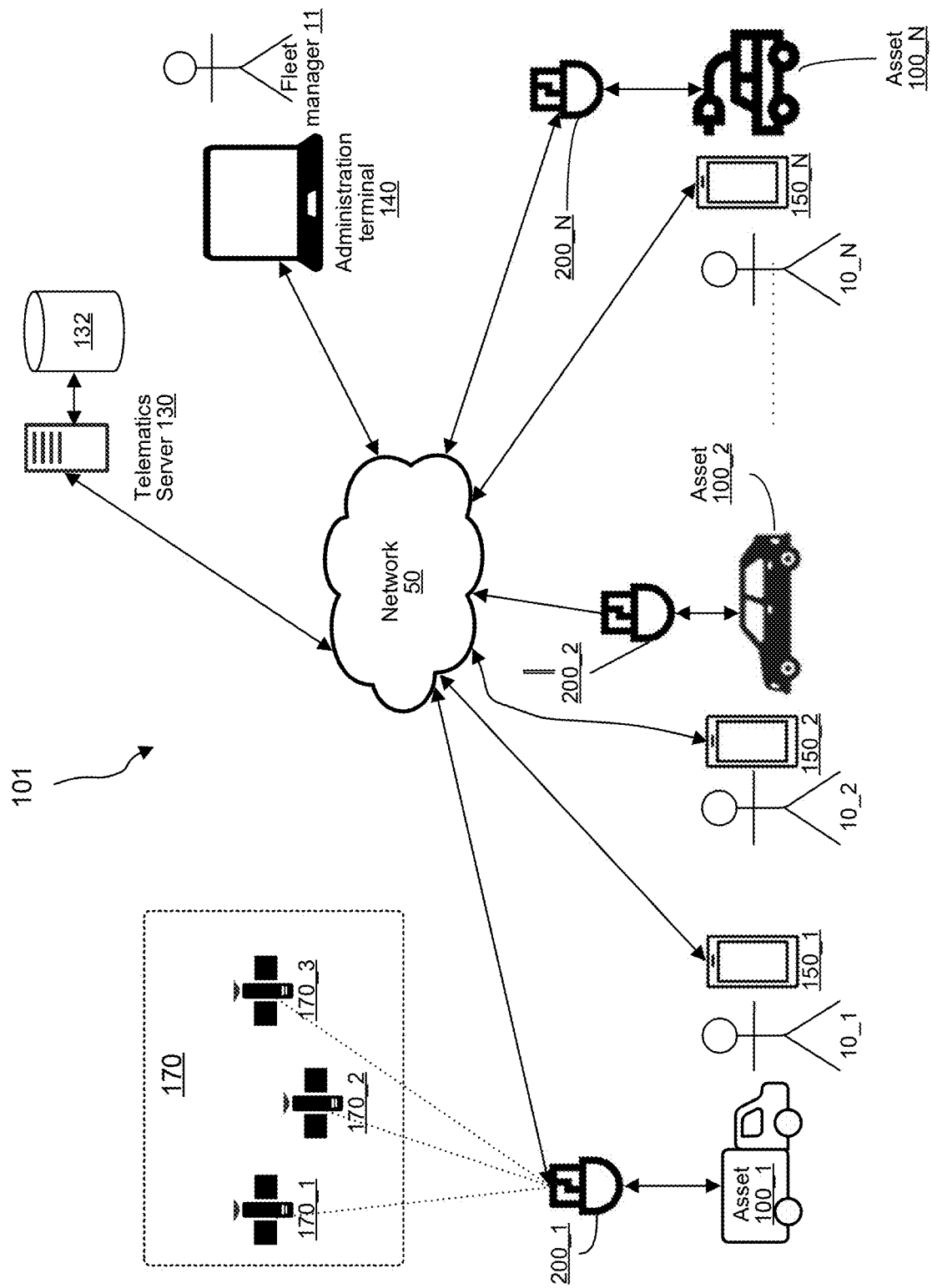
FIG. 1 is a schematic diagram of an exemplary telematics system including a plurality of telematics devices coupled to a plurality of vehicular assets.

A telematics system is a technology that combines telecommunications and informatics to monitor and manage remote assets including vehicles and other equipment. A telematics system may collect data from a high number of assets, either directly or through telematic devices. A telematics device is a hardware component that enables telematics functionality. A telematics device collects and transmits data related to an asset's performance, location, and operating status. A telematics device is either a self-contained telematics device installed at an asset, or an integrated telematics device that is integrated into the asset itself. In either case, telematics data is captured or gathered by the telematics device. FIG. 1 shows a high-level block diagram of a telematics system 101. The telematics system 101 includes a telematics server 130, (N) telematics devices shown as telematics device 200_1, telematics device 200_2 . . . through telematics device 200_N ("telematics device 200"), a network 50, administration terminal 140, and operator terminals 150_1, 150_2 . . . through 150_N ("the operator terminals 150"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("the satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car. The asset 100_N is shown as an electric vehicle (EV). Other types of vehicles, which are not shown, are also contemplated in the various embodiments of the present disclosure, including but not limited to, farming vehicles, construction vehicles, military vehicles, and the like. Most vehicles currently use internal combustion engines (ICEs) including spark-ignition ("gasoline") and compression-ignition ("diesel") engines. Both gasoline and diesel engines utilize the reciprocating motion of one or more pistons in a cylinder. Gasoline and diesel engines can use either a four-stroke cycle or a two-stroke cycle. A less commonly used ICE is the rotary ("Wankel") engine. Electric vehicles (EVs) come in many types. Battery Electric Vehicles (BEVs) are fully electric vehicles that rely solely on electricity for propulsion. They are equipped with large battery packs that store electricity, which is used to power an electric motor. Hybrid Electric Vehicles (HEVs) have both an internal combustion engine and an electric motor but cannot be charged externally. They rely on regenerative braking to charge a small battery that assists the internal combustion engine during acceleration and provides additional power when needed. Plug-in Hybrid Electric Vehicles (PHEVs) combine an internal combustion engine (usually gasoline) with an electric motor and a larger battery pack. They can be charged from an electrical outlet, allowing them to operate in electric-only mode for a certain range before switching to the internal combustion engine. Extended-Range Electric Vehicles (EREVs) are similar to PHEVs but typically have larger battery packs, allowing for a longer electric-only range. When the battery is depleted, an inboard gasoline engine acts as a generator to recharge the battery and provide electricity for the electric motor. The gasoline engine does not directly drive the wheels, making EREVs functionally electric for most of their use. Fuel Cell Electric Vehicles (FCEVs) use hydrogen gas as a fuel source, which is combined with oxygen from the air in a fuel cell to produce electricity to power an electric motor. The only emissions from FCEVs are water vapor. Solar-powered electric vehicles incorporate solar panels on their roofs or other surfaces. These panels generate electricity from sunlight, which can supplement the vehicle's battery charge.

While the assets shown in FIG. 1 are all land vehicles, this is not always the case. An asset may also be a marine vehicle or an airborne vehicle employing an ICE, an electric motor, or any other engine such as a jet engine, a rocket propulsion engine, and so on.

In some cases, an asset is a stationary machine such as a generator, a concrete mixer, a compressor, and the like.

The telematics devices 200 are coupled to assets 100. For example, in FIG. 1 the telematics device 200_1 is coupled to the asset 100_1. Similarly, the telematics device 200_2 is coupled to the asset 100_2 and the telematics device 200_N is coupled to the asset 100_N. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 130, between the administration terminal 140 and the telematics server 130, and between the operator terminals 150 and the telematics server 130.

In some implementations of the telematics system 101, the network 50 is a cellular network utilizing cellular technology. In one implementation, the network 50 uses the second-generation (2G) cellular technology which is based on the Global System for Mobiles (GSM) protocol and supports data transmission protocols such as the General Packet Radio Service (GPRS) or the Enhanced Data rates for GSM Evolution (EDGE). In another implementation, the network 50 uses the Third-generation (3G) cellular technology utilizing the Universal Mobile Telephone System (UMTS) supporting data transfer using the High Speed Packet Access (HSPA) protocol. In yet another implementation, the network 50 uses the Fourth-generation cellular technology (4G) which uses the Long Term Evolution (LTE) protocol. In another implementation, the network 50 uses the Fifth-generation (5G) cellular technology. In yet another implementation, the network 50 uses the Narrowband Internet of Things (NB-IoT) which is a low-power wide-area network (LPWAN) technology that is part of the Third Generation Partnership Project (3GPP) standard.

In some implementations of the telematics system 101, the network 50 comprises a Wide Area Network (WAN) using non-cellular WAN technologies. One example of a non-cellular WAN technology that the network 50 can use is the Worldwide Interoperability For Microwave Access (WiMAX™) which is based on the IEEE 810.16 family of standards. Another example of a non-cellular WAN technology that the network 50 may use is Long Range Wide Area Network (LoRaWAN™) technology which is a low-power WAN protocol. Yet another example of a non-cellular WAN technology that the network 50 may use is Weightless which is a family of open standard low-power WAN (LPWAN) technology that operate in the sub-GHz frequency bands.

In some implementations of the telematics system 101, the network 50 comprises a Wide Area Network (WAN) using non-cellular WAN technologies. One example of a non-cellular WAN technology that the network 50 can use is the Worldwide Interoperability For Microwave Access (WiMAX™) which is based on the IEEE 810.16 family of standards. Another example of a non-cellular WAN technology that the network 50 may use is Long Range Wide Area Network (LoRaWAN™) technology which is a low-power WAN protocol. Yet another example of a non-cellular WAN technology that the network 50 may use is Weightless which is a family of open standard low-power WAN (LPWAN) technology that operate in the sub-GHz frequency bands.

In some implementations, the network 50 is a combination of the above-specified technologies.

The telematics server 130 is an electronic device executing machine-executable programming instructions which enable the telematics server 130 to store and analyze telematics data. The telematics server 130 may be a single computer system or a cluster of computers. In some implementations, the telematics server 130 utilizes an operating system such as Linux, Windows, Unix, FreeBSD, macOS Server, VMware ESXI, Microsoft Hyper-V Server, Oracle Solaris, IBM AIX, or any other equivalent operating system. In other implementations, the telematics server 130 is implemented on a cloud computing platform, such as Amazon Web Service (AWS), Microsoft Azure, Google Cloud Platform (GCP), IBM Cloud, Oracle Cloud, and Alibaba Cloud. The telematics server 130 is connected to the network 50 and is capable of receiving telematics data from the telematics devices 200. In some implementations, the telematics server 130 has a plurality of software modules for performing data analysis and analytics on the telematics data to obtain useful asset information about the assets 100. In some implementations, the telematics server 130 is coupled to a telematics database 132 for storing telematics data and/or the results of the analytics which are related to the assets 100. In some implementations, the asset information stored includes operator information about the operators 10 corresponding to the assets. In some implementations, the telematics server 130 communicates the asset data and/or the operator information pertaining to an asset 100 to the administration terminal 140 and/or the operator terminal 150.

The satellites 170 may be part of a global navigation satellite system (GNSS) which is a satellite-based navigation system that provides positioning, navigation, and timing services worldwide. The four primary GNSS systems in operation today are Global Positioning System (GPS), Global Navigation Satellite System (GLONASS), Galileo, and BeiDou. GPS was developed and operated by the United States, GLONASS is the Russian counterpart of GPS, Galileo is the European Union's GNSS, and BeiDou is the Chinese GNSS system. Other less commonly used GNSS systems are QZSS (Japan) and IRNSS or NavIC (India). The location information may be processed by a location module on the telematics device 200 to provide location data indicating the location of the telematics device 200 (and hence the location of the asset 100 coupled thereto). In other implementations (not shown), the telematics device 200 may use other means to determine the location thereof as outlined below.

The administration terminal 140 is an electronic device capable of connecting to the telematics server 130, over the network 50. The administration terminal 140 can be configured to retrieve data and analytics related to one or more assets 100; to receive alerts from the telematics server 130 in respect of one or more conditions on the telematics device 200; and/or to issue commands to one or more telematics device 200 via the telematics server 130. The administration terminal 140 is shown as a laptop computer, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). In some implementations, the administration terminal 140 runs a web browser or a custom application which allows retrieving data and analytics, pertaining to one or more assets 100, from the telematics server 130 via a web interface of the telematics server 130. In some implementations, the administration terminal 140 is used to issue commands to one or more telematics device 200 via the telematics server 130. In some implementations, an administrator 11 communicates with the telematics server 130 using the administration terminal 140. In addition to retrieving data and analytics, the administration terminal 140 allows the administrator 11 to set alerts and geofences for keeping track of the assets 100, receiving notifications of deliveries, receiving notifications of vehicle conditions, and receiving alerts pertaining to driver behavior.

The operator terminals 150 are electronic devices, similar to the administration terminals 140. The operator terminals 150 are shown as smartphones, however, this is not necessarily the case. An administration terminal is any one of: a desktop computer, an industrial human-machine interface (HMI), a touch screen panel, a table, a smartphone, an Augmented Reality (AR) headset, and a Network Operations Center (NOC). The operator terminals 150 are used by operators 10 (for example, vehicle drivers) of the assets 100 to both track and configure the usage of the assets 100. For example, as shown in FIG. 1, the operator 10_1 has the operator terminal 150_1, the operator 10_2 has the operator terminal 150_2, and the operator 10_N has the operator terminal 150_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 150 are in communication with the telematics server 130 over the network 50. The operator terminals 150 may run at least one asset configuration application. The asset configuration application may be used by operator 10 to inform the telematics server 130 that asset 100 is currently being operated by operator 10. For example, the operator 10_2 may use an asset configuration application on the operator terminal 150_2 to indicate that the operator 10_2 is currently using the asset 100_2. The telematics server 130 updates the telematics database 132 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. In some implementations, the asset data is combined with location data obtained by the telematics device 200 from a location module in communication with the satellites 170 and/or sensor data gathered from sensors in the telematics device 200 or another device coupled to the telematics device 200. The combined asset data, location data, and sensor data are termed "telematics data." The telematics device 200 sends the telematics data to the telematics server 130 over the network 50. The telematics server 130 processes, aggregates, and/or analyzes the telematics data to generate asset information pertaining to the assets 100 or to a fleet of assets. In some implementations, the telematics server 130 stores the telematics data and/or the generated asset information in the telematics database 132. In some implementations, the administration terminal 140 connects to the telematics server 130, over the network 50, to access the generated asset information. In other implementations, the telematics server 130 pushes the generated asset information to the administration terminal 140. In some implementations, the operators 10 use the operator terminals 150 to indicate to the telematics server 130 which assets 100 they are associated with. In response, the telematics server 130 updates the telematics database 132 to associate an operator 10 with an asset 100. In some implementations, the telematics server 130 provides additional analytics related to the operators 10 including work time, location, and operating parameters. For example, for vehicle assets, the telematics data may include turning, speeding, and braking information. The telematics server 130 can correlate the telematics data to the vehicle's driver by querying the telematics database 132 for a particular vehicle and retrieving the associated driver information. In some implementations, an administrator 11 uses the administration terminal 140 to set alerts for certain activities pertaining to the assets 100. When criteria for an alert is met, the telematics server 130 sends a message to the administration terminal 140 to notify an administrator 11. In some implementations, the telematics server 130 sends alerts to the operator terminal 150 to notify an operator 10 of the alert. For example, a vehicle driver operating the vehicle outside of a service area or hours of service (HOS) may receive an alert on their operator terminal 150. In some implementations, an administrator 11 uses the administration terminal 140 to configure a telematics device 200 by issuing commands thereto via the telematics server 130. In some implementations, the telematics server 130 sends alerts to the telematics device 200 to generate an alert to the driver such as a beep, a displayed message, or an audio message.

Figure 2:
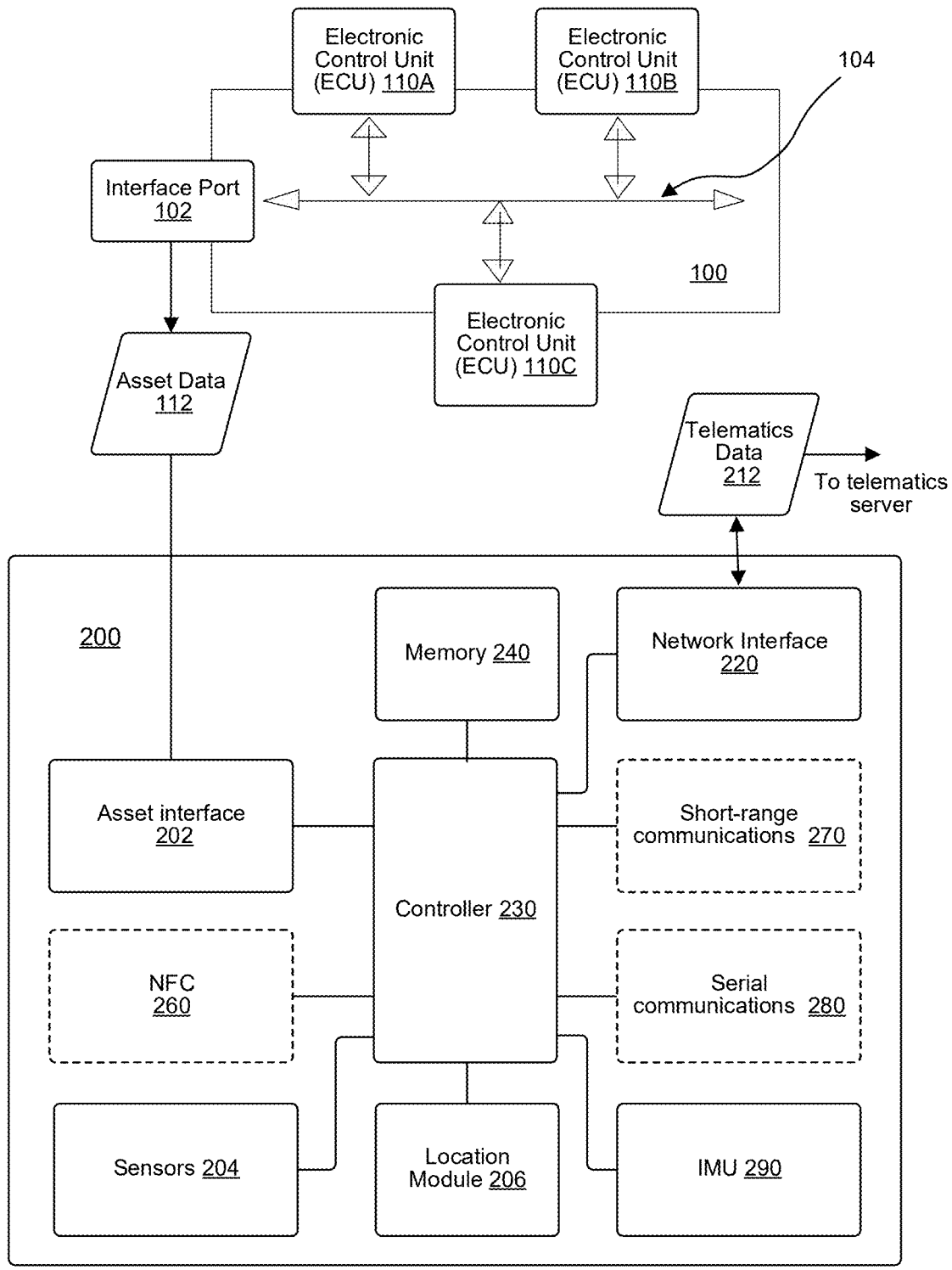
FIG. 2 is a block diagram showing a telematics device coupled to an asset's communications bus via an interface port.

The asset 100 may have a plurality of electronic control units (ECUs) of the above-mentioned types. A vehicle may, for example, have around seventy ECUs. For simplicity, only a few of the ECUs 110 are depicted in FIG. 2. For example, in the depicted embodiment the asset 100 has three ECUs shown as the ECU 110A, the ECU 110B, and the ECU 110C ("the ECUs 110"). The ECU 110A, the ECU 110B, and the ECU 110C are shown to be interconnected via an asset communications bus.

The most commonly used type of asset communications bus is the Controller Area Network (CAN) bus. CAN is a robust and standardized communication protocol designed for real-time control applications. The CAN bus is a physical bus used to connect various ECUs and sensors, allowing them to exchange data and commands. CAN ensures that different vehicle systems can work together seamlessly. ECUs are connected to the CAN bus using dedicated CAN transceivers and connectors.

Another type of asset communications bus is the Local Interconnect Network (LIN) bus, which is used for slower-speed communication between certain ECUs, particularly for non-critical functions like interior lighting and seat controls. FlexRay is another communication protocol used in some high-performance and safety-critical applications. It provides faster data rates and deterministic communication, making it suitable for advanced driver assistance systems (ADAS) and other critical functions. In some modern vehicles, particularly those with advanced infotainment systems and autonomous driving features, Ethernet networks are used to handle high-bandwidth data communication. As such, while this disclosure discusses CAN and related protocols, it would be apparent to those of skill in the art that the methods described herein are applicable to the aforementioned protocols and similar protocols.

As discussed above, the most commonly used type of an asset communications bus is the CAN bus. For example, in FIG. 2 the ECUs 110 are interconnected using the CAN bus 104. The ECUs 110 send and receive information to one another in CAN data frames by placing the information on the CAN bus 104. When an ECU 110 places information on the CAN bus 104, other ECUs 110 receive the information and may or may not consume or use that information.

Different protocols may be used to exchange information between the ECUs over a CAN bus. For example, ECUs 110 in trucks and heavy vehicles use the Society of Automotive Engineering (SAE) J1939 protocol to exchange information over a CAN bus 104. J1939 is based on CAN and is used for diagnostic and communication purposes. Most passenger vehicles use the SAE J1979 protocol, which is commonly known as On-Board Diagnostic II (OBD-II) protocol to exchange information between ECUs 110 on their CAN bus 104. OBD-II is a standardized diagnostic protocol used in most vehicles manufactured since the late 1990s. OBD-II provides a common interface for diagnostic tools to communicate with a wide range of ECUs in the vehicle, including the engine control module (ECM), transmission control module (TCM), and more. OBD-II allows for reading diagnostic trouble codes (DTCs), live data, and performing various diagnostic tests. The Unified Diagnostics Services (UDS) protocol is a diagnostic protocol that operates over various physical layers, including CAN, LIN, and FlexRay. ISO 9141 is an older diagnostic protocol that was commonly used in vehicles manufactured in the 1990s and early 2000s. ISO 9141 has largely been replaced by OBD-II but is still encountered in some older vehicles. The Keyword Protocol 2000 (KWP2000) is another older protocol that was used for vehicle diagnostics, particularly in European vehicles. Like ISO 9141, it has been largely replaced by OBD-II. Some automakers, such as General Motors (GM) and Ford, have their proprietary diagnostic protocols for communication with ECUs in their vehicles. GM has a GMLAN protocol and Ford has a Ford Standard Corporate Protocol (SCP). Similarly, Volkswagen Auto Group-Communication (VAG-COM) is a proprietary diagnostic protocol used in Volkswagen Auto Group (VAG) vehicles, including VW, Audi, SEAT, and Skoda. Diagnostics over Internet Protocol (DoIP) is a newer diagnostic protocol that leverages Ethernet or IP-based networks for vehicle diagnostics. DoIP is used in some modern vehicles with advanced electronic systems.

An asset 100 may allow access to information exchanged over the CAN bus 104 via an interface port 102. For example, if the asset 100 is a passenger car, then the interface port 102 is most likely an OBD-II port. Data accessible through the interface port 102 is termed the asset data 112. In some implementations, the interface port 102 includes a power interface for providing electric power to a telematics device 200 connected thereto.

Telematics Device

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The telematics device 200 includes a controller 230 coupled to a memory 240, an asset interface 202 and a network interface 220. The telematics device 200 also includes one or more sensors 204 and a location module 206 coupled to the controller 230. In some implementations, the telematics device 200 contains an inertial measurement unit, shown as the IMU 290. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data. Some telematics devices may not have any sensors 204 and may rely on external sensors for obtaining sensor data.

The controller 230 may include one or any combination of a processor, a microprocessor, a microcontroller (MCU), a central processing unit (CPU), a System-on-Chip (SOC), a processing core, a state machine, a logic gate array, an application-specific integrated circuit (ASIC), a field-programmable gate array (FPGA), or any other hardware component or combination of hardware components capable of executing machine-executable programming instructions. The controller 230 may follow a Von Neumann Architecture, a Harvard Architecture, or a Modified Harvard Architecture. The controller 230 may be a Complex Instruction Set Computer (CISC) processor supporting a complex instruction set that can perform multiple operations in a single instruction. Alternatively, the controller 230 may be a Reduced Instruction Set Computer (RISC) processor having a simplified and streamlined instruction set, and employs a pipeline architecture to optimize execution. The controller 230 may have a single processor core or multiple processor cores supporting parallel execution of instructions. The controller 230 may have an internal memory for storing machine-executable programming instructions to be executed by the controller 230 to carry out the steps of the methods described in this disclosure.

The memory 240, an electronic storage component, stores both data and machine-executable programming instructions and can be implemented using various technologies, including read-only memory (ROM) types like PROM, EPROM, EEPROM, and Flash memory, as well as random access memory (RAM) types such as SRAM and DRAM. Additionally, it may comprise Ferroelectric RAM (FRAM), Magnetic Random Access Memory (MRAM), or Phase-Change Memory (PCM), or any combination of these. Functioning to support the disclosure's described functionality, the memory 240 is connected to the controller 230 via a memory bus, allowing the controller 230 to execute stored machine-executable programming instructions and access stored data.

The location module 206 determines the location of the telematics device 200. The location data may be in the form of a latitude and longitude, in Universal Transverse Mercator (UTM) coordinates, or any other similar form.

In some implementations, the location module 206 is a GNSS transceiver supporting one or more of the aforementioned GNSS technologies. The location module 206 may be integrated into the controller 230 or coupled to the controller 230 by a serial interface such as the Serial Peripheral Interface (SPI), the Inter-Integrated Circuit (I2C), Universal Asynchronous Receiver Transmitter (UART), Universal Serial Bus (USB), and Secure Digital Input/Output (SDIO).

In other implementations, the location module 206 determines the location of the telematics device 200 from a cellular network using cell tower triangulation. In this case, the location module 206 is a firmware module that computes location based on information received from the network interface 220, which in this case is a cellular modem providing signal measurements from multiple nearby cell towers. The location module 206 uses the signal measurements to estimate the location of the telematics device 200. The location data determined by the location module 206 is sent to the controller 230.

The sensors 204 may be one or more of: a temperature sensor, a pressure sensor, an optical sensor, a humidity sensor, a gas sensor, an acoustic sensor, a pH sensor, a soil moisture sensor, or any other suitable sensor indicating a condition pertaining to the asset 100 to which the telematics device 200 is coupled. The sensors 204 are coupled to the controller via any one of serial, parallel, or bus technologies. The sensors 204 provide sensor data to the controller 230. Some telematics devices may not have any sensors 204 and may only provide location information and/or IMU information. Some telematics devices may have the capability of pairing with external sensors via a wired or a wireless interface.

The asset interface 202 is a hardware component that allows the telematics device 200 to read asset data 112 from the interface port 102 of the asset 100 and also to send vehicle data requests to one or more ECUs requesting asset data. Some vehicle data requests may be in the form of configuration commands that configure the ECUs 110 in a particular way to adjust the performance of the vehicle, for example. In some implementations the asset interface 202 receives power from the asset 100 via the interface port 102 for powering the telematics device 200. In the case of an asset employing a CAN bus 104, the asset interface 202 includes an interface connector and a CAN transceiver.

Figure 4:
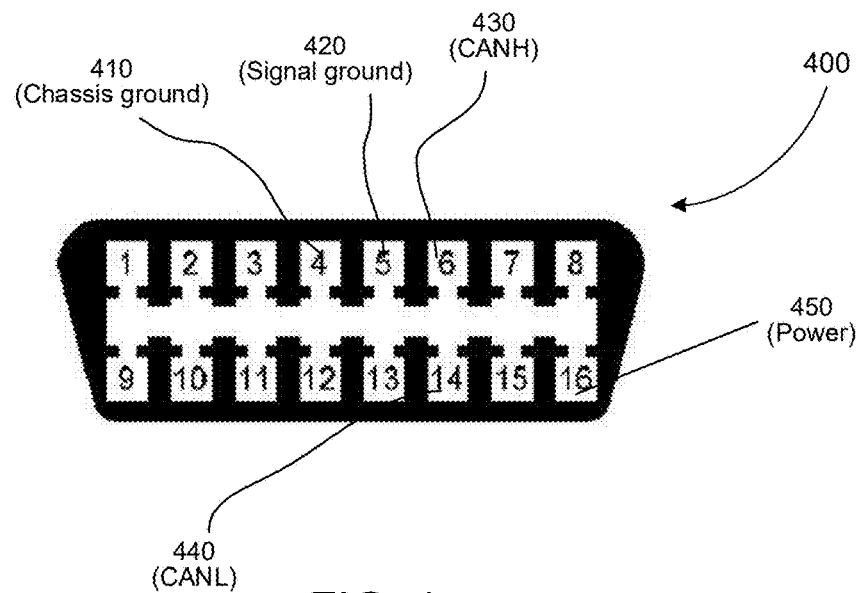
FIG. 4 depicts an exemplary On Board Diagnostics II (OBD-II) connector.

In some implementations, the interface connector of the asset interface 202 is an OBD-II connector configured to mate with a corresponding OBD-II connector of the interface port 102 of the asset 100, which in this case would be an OBD-II port. On a CAN bus 104, data is exchanged over two signal lines named CANH (CAN High) and CANL (CAN Low). A typical OBD-II port on a vehicle has a number of pins including a CANH pin and a CANL pin. FIG. 4 depicts the pins of an OBD-II port 400 commonly present in modern vehicles which are also the pins of a corresponding OBD-II connector. The OBD-II port 400 has a chassis ground pin 410 (pin 4 of the connector), a signal ground pin 420 (pin 5 of the connector), a CANH pin 430 (pin 6 of the connector), a CANL pin 440 (pin 14 of the connector), and a power pin 450 (pin 16 of the connector). The CANH pin 430 and the CANL pin 440 carry CAN data that needs to be captured by a telematics device 200, and carry CAN or other protocol vehicle data requests from the telematics device 200 to the ECUs 110 of the asset 100. Other pins of the OBD port may be used for other protocols but are not shown for brevity.

Figure 5:
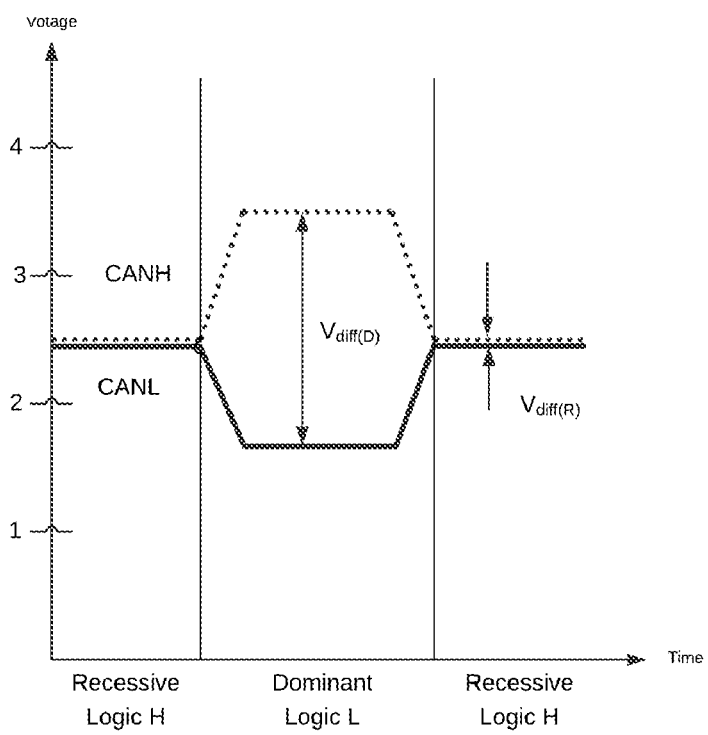
FIG. 5 is a graph depicting the logic voltage levels of Controller Area Network (CAN) signals.

A CAN transceiver converts CAN-level signals at the interface port 102 to digital-level signals that can be read by the controller 230. Conversely, the CAN transceiver also converts digital-level signals output by the controller 230 to CAN-level signals that are sent to the CAN bus 104 over the interface port 102. Digital-level signals are typically 5V or 3.3V for logic "1" or HIGH, and 0V for logic "0" or LOW. CAN logic levels are shown in FIG. 5. Data on a CAN bus is represented by the CANH and CANL signals. As shown in FIG. 5, the CAN interface defines logic "0" ("LOW") as the dominant state, and logic "1" ("HIGH") as the recessive state. In the dominant state, the CANH signal is set to a voltage of 3.5V while the CANL signal is set to a voltage of 1.5V. In the recessive state, the CANH and the CANL are both set to 2.5V. A CAN transceiver converts a logic LOW on the CAN bus to a digital LOW signal at 0V, and converts a Logic HIGH on the CAN bus to a digital HIGH signal at a positive voltage (e.g., 5V).

The IMU 290, an inertial measurement unit, measures and provides data regarding the telematics device's motion, orientation, and acceleration, and it may consist of components like an accelerometer, gyroscope, magnetometer, and barometer. The accelerometer measures linear acceleration across three axes, the gyroscope measures angular velocity around those axes, the magnetometer determines heading relative to Earth's magnetic field, and the barometer measures atmospheric pressure for altitude estimation. Alternatively, some telematics devices might forgo an IMU, relying on location module 206 data to infer motion.

The IMU 290 may be integrated into the controller 230 or may be a separate component that communicates with the controller 230 via a parallel interface, a serial interface using any one of the above-mentioned serial technologies, a bus interface using any one of the above-mentioned bus technologies. Alternatively or additionally, the IMU 290 may connect directly to General Purpose Input/Output (GPIO) and/or interrupt pins of the controller 230. The controller 230 can configure the IMU 290 by sending configuration commands thereof. Additionally, the controller 230 can query the status of the IMU 290 generally or in response to receiving an interrupt signal therefrom.

The network interface 220, in some implementations, incorporates a cellular modem that leverages various cellular technologies. Specifically, it may utilize second-generation (2G) technology, based on the Global System for Mobiles (GSM) protocol, supporting data transmission via General Packet Radio Service (GPRS) or Enhanced Data rates for GSM Evolution (EDGE). Alternatively, it could employ third-generation (3G) technology, using the Universal Mobile Telephone System (UMTS) and facilitating data transfer through the High Speed Packet Access (HSPA) protocol. Furthermore, the network interface 220 might utilize fourth-generation (4G) cellular technology, which uses the Long Term Evolution (LTE) protocol, or fifth-generation (5G) cellular technology. In some cases, it may use Narrowband Internet of Things (NB-IoT), a low-power wide-area network (LPWAN) technology within the Third Generation Partnership Project (3GPP) standard.

In some implementations, the network interface 220 comprises a Wide Area Network (WAN) modem using non-cellular WAN technologies. The network interface 220 may use non-cellular WAN technologies. One example of a non-cellular WAN technology that the network interface 220 can use is the Worldwide Interoperability For Microwave Access (WiMAX™) which is based on the IEEE 810.16 family of standards. Another example of a non-cellular WAN technology that the network interface 220 may use is Long Range Wide Area Network (LoRaWAN™) technology which is a low-power WAN protocol. Yet another example of a non-cellular WAN technology that the network interface may use is Weightless which is a family of open standard low-power WAN (LPWAN) technology that operate in the sub-GHz frequency bands.

In some implementations, the network interface 220 uses a wired network technology when the telematics device 200 is coupled to an asset that provides wired network connectivity. Examples of wired network technologies include Ethernet, Fast Ethernet, Local Talk™, Token Ring, Fiber Distributed Data Interface (FDDI), and Asynchronous Transfer Mode (ATM).

The network interface 220 may be integrated into the controller or coupled thereto via a parallel interface, a serial interface using any one of the above-mentioned serial technologies, a bus interface using any one of the above-mentioned bus technologies, or may connect directly to General Purpose Input/Output (GPIO) and interrupt pins of the controller 230.

The network interface 220 allows the telematics device 200 to send/receive data to/from remote devices such as the telematics server 130.

The short-range wireless communications module 270 enables short-range wireless communication for the telematics device 200, incorporating technologies like Bluetooth, Wi-Fi, Zigbee, Z-Wave, or RFID, or other comparable short-range modules. Bluetooth, operating in the 2.4 GHz band, facilitates short-range device communication, while Wi-Fi, utilizing 2.4 GHz and 5 GHz bands, provides higher data rates for local area network connectivity. Zigbee, based on IEEE 810.15.4, is a low-power protocol for wireless sensor networks, and Z-Wave, operating in the sub-GHz range, offers extended range and better wall penetration. RFID uses electromagnetic fields for object tracking and identification. This module allows external devices, such as wireless sensors, to transmit data to the telematics device 200 via a short-range wireless network.

The NFC module 260 is a Near Field Communication (NFC™) module. NFC is a short-range wireless communication technology that enables devices to establish communication and exchange data when they are in close proximity to each other. In some implementations, the NFC module 260 is an NFC reader which can read information stored on an NFC tag. The NFC module 260 can be used to confirm the identity of the operator 10 by having the operator 10 tap an NFC tag onto the telematics device 200 such that the NFC tag is read by the NFC module 260.

The serial communications module 280 is an example of a wired communications module. The serial communications module 280 is an electronic peripheral for providing serial wired communications to the telematics device 200. For example, the serial communications module 280 may be one of a Universal Asynchronous Receiver Transmitter (UART), a Serial Peripheral Interface (SPI), an Inter-Integrated Circuit (I2C) module, a Controller Area Network (CAN) transceiver, or an RS-232 transceiver. A UART enables synchronous data transmission between devices and supports relatively low data rates. SPI is a synchronous serial communication protocol that allows devices to exchange data in full-duplex mode. 12C is a serial communication protocol that enables devices to communicate using a two-wire interface. CAN is a serial communication bus commonly used in automotive and industrial applications. In some implementations, the telematics device 200 accepts connections from input/output devices that use the CAN protocol. In some implementations, the serial communications module 280 allows an external device to connect with the telematics device 200 for downloading asset data 112 therefrom. In some implementations, the serial communications module allows external sensors to send sensor data to the telematics device 200.

In operation, ECUs communicate asset data over the asset communications bus. The telematics device 200 captures asset data 112 over the asset communications bus via the interface port 102. As an example, an ECU 110, such as the ECU 110A, the ECU 110B, or the ECU 110C places CAN data over the CAN bus 104. The CAN data exchanged between the ECUs 110, over the CAN bus 104 are accessible via the interface port 102 and may be retrieved as the asset data 112 by the telematics device 200. The controller 230 of the telematics device 200 receives the asset data 112 via the asset interface 202. In some implementations, the controller 230 receives sensor data from the sensors 204 and/or location data from the location module 206. The controller 230 combines the asset data 112 with the sensor data and the location data to obtain the telematics data 212. The controller 230 transmits the telematics data 212 to the telematics server 130 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some implementations, the telematics device 200 receives, via the network interface 220, commands from the telematics server 130. The received commands instruct the telematics device 200 to be configured in a particular way. For example, the received commands may configure the way in which the telematics device gathers asset data 112 from the asset 100 as will be described in further detail below.

The telematics data 212 may be used to derive useful asset information and analytics, by the telematics server 130.

Integrated Telematics Device

Figure 3:
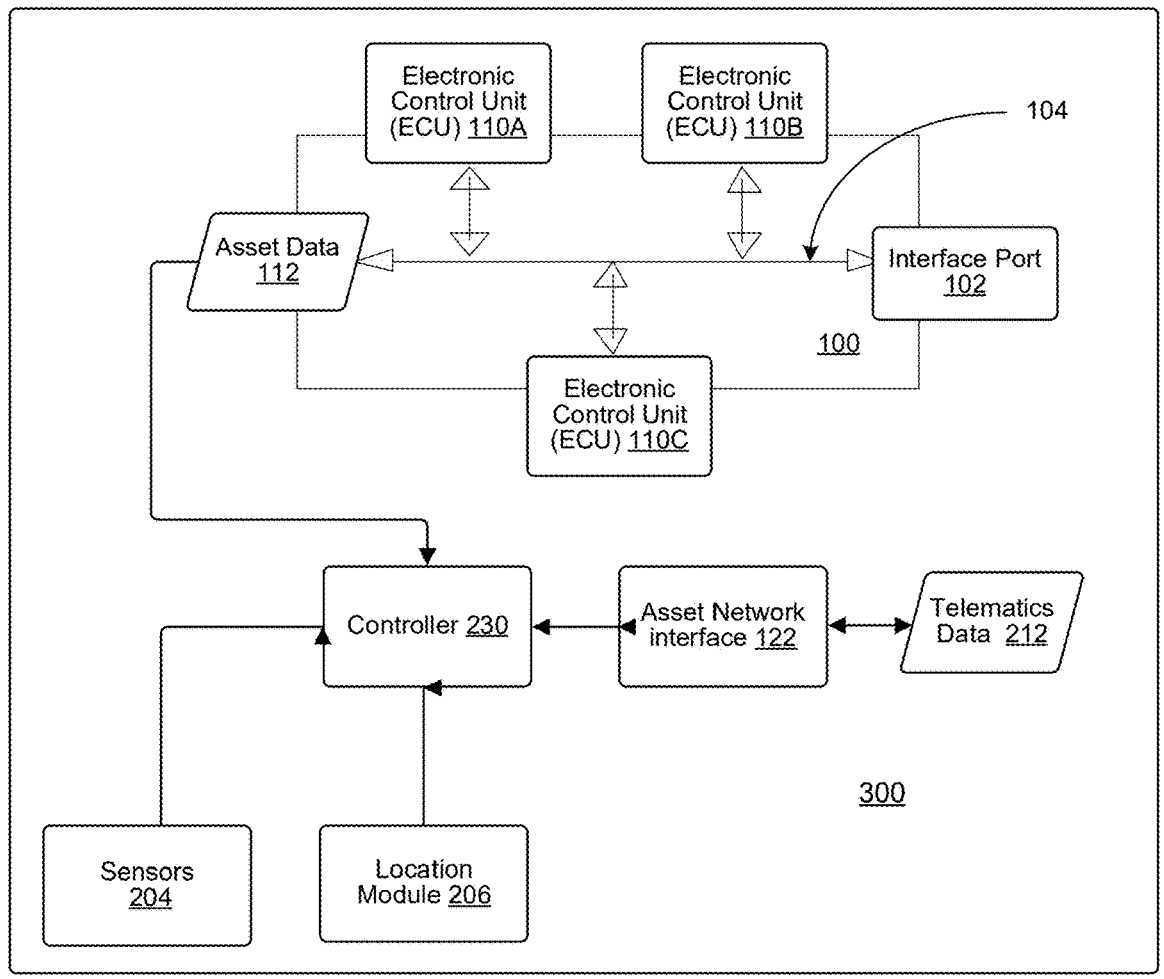
FIG. 3 is a block diagram showing an asset having a telematics device integrated therein.

In the above-mentioned figures, a telematics device 200 is shown as a separate entity connected with an asset 100. The telematics device 200, however, may have its components integrated into the asset 100 at the time of manufacture of the asset 100. This is the case when the asset 100 is a connected car having an asset network interface. For example, with reference to FIG. 3, there is shown an asset 300 with the components of a telematics device integrated therein, in accordance with implementations of the present disclosure. The asset 300 is similar to the asset 100 but, being a connected asset such as a connected car, it has an asset network interface 122 similar to the network interface 220. In the depicted embodiment, the controller 230 is directly connected to the asset communications bus, which is a CAN bus 104 and may directly obtain the asset data 112 therefrom. In some implementations, the controller 230 is an ECU running telematics firmware that performs the same functionality as the functionality of the telematics device 200. The sensors 204 and the location module 206 are also integrated into the asset 100 and provide the sensor data and the location data to the controller 230 as described above. The asset network interface 122 belongs to the asset 300 and may be used by the asset 300 to communicate with an original equipment manufacturer (OEM) server, to a roadside assistance server, or for other purposes. The controller 230 may utilize the asset network interface 122 for the transmission of telematics data 212. The asset 300 may have an interface port 102 for connecting other devices other than a telematics device, such as a diagnostic tool including, but not limited to, an OBD-II reader device.

Capturing Asset Data

A telematics device 200 may capture asset data 112 via the interface port 102 of an asset 100 via one of two main methods.

The first method is for the telematics device 200 to listen for broadcast asset data placed by the ECUs 110 on the asset communications bus. For example, for the CAN bus 104, the ECUs 110 may place broadcast asset data in the form of broadcast CAN data frames on the CAN bus 104 that the telematics device 200 can capture over the interface port 102.

Figure 6A:
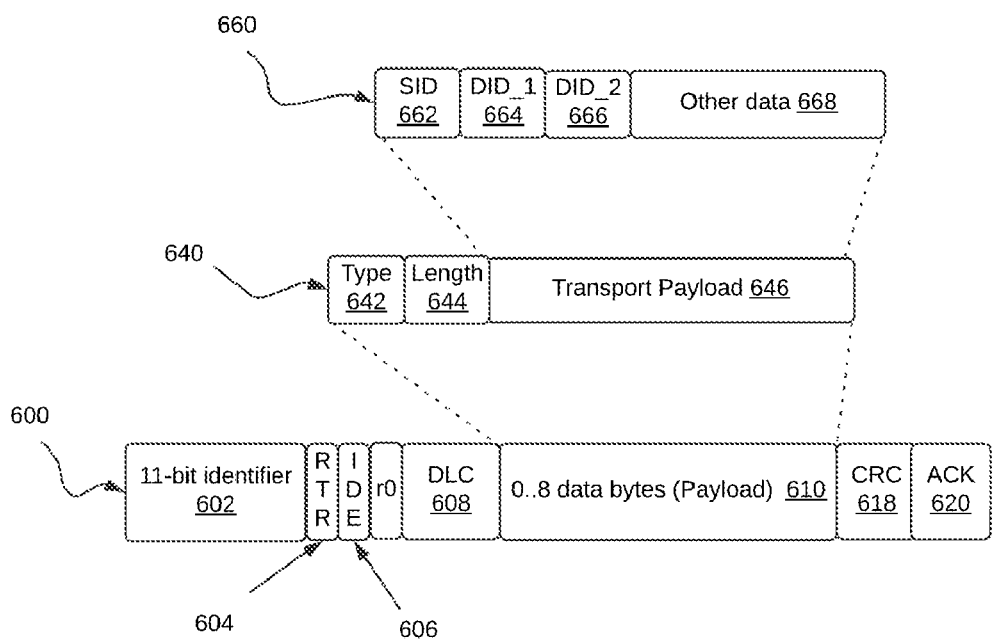
FIG. 6A is a diagram depicting a CAN frame, a transport frame within the CAN frame, and a diagnostic protocol frame within the transport frame.

The second method is for the telematics device 200 to actively solicit asset data 112 via asset data requests packaged in asset data messages sent to a particular ECU. For an asset employing a CAN bus 104, the telematics device 200 sends asset data requests in CAN data frames sent to an ECU 110. The ECU 110 responds with the requested asset data inside an asset data message directed to the telematics device 200. For an asset employing a CAN bus 104, the ECU 110 sends the requested asset data 112 packaged in a CAN data frame sent back to the telematics device 200. The asset data 112 is received, at the telematics device 200, in the form of asset data messages. For assets employing a CAN bus 104, the asset data messages are in the form of CAN data frames. Inside CAN data frames, standard protocol messages implementing standardized protocols such as OBD-II and UDS are present, typically encapsulated in a transport protocol frame. Additionally, CAN data frames may also encapsulate proprietary protocols messages specific to vehicles of particular types. FIG. 6A depicts a typical arrangement of protocols inside a CAN frame.

The CAN protocol uses the network and data link layers of the International Standards Organization (ISO) 7-layer model. For broadcast asset data that ECUs 110 place on the CAN bus 104, the ECUs 110 can use broadcast CAN data frames. For asset data requests and asset data responses, a transport protocol is used and therefore a transport frame is encapsulated within a CAN data frame. A diagnostic protocol allows sending diagnostic commands and receiving diagnostic data. Both the diagnostic command and the diagnostic data are typically encapsulated within transport frames. FIG. 6A depicts a standard CAN data frame in the form of CAN data frame 600, a transport frame 640, and a diagnostic frame 660. The CAN data frame 600 consists of an 11-bit CAN identifier 602, a remote transmission request (RTR) bit in the form of the RTR bit 604, an identifier extension (IDE) bit in the form of the IDE bit 606, a length code (DLC) in the form of DLC 608, a CAN frame payload 610 of 8 data bytes, a CRC field 618, and an acknowledgement field in the form of ACK field 620.

The 11-bit identifier field stores a CAN identifier 602. The CAN protocol requires that all contending messages have a unique identifier. An ECU 110 typically has a CAN ID on which it receives requests and another CAN ID on which it sends responses. For example, an ECU may receive requests on CAN ID 0x750 and then provide responses using the CAN ID 0x758. In this case, a diagnostic tool or a telematics device prepares a CAN data frame 600 containing the CAN ID 0x750 along with request data and places the CAN data frame 600 on the CAN bus 104. Subsequently, a diagnostic tool or a telematics device listens on the CAN bus 104 for a CAN frame containing the CAN ID 0x758, then examines the CAN frame payload 610 of the CAN data frame 600 for a response to the previously sent request. More on the requests and responses will be explained below.

The RTR bit 604 denotes a remote transmission request.

The IDE bit 606 has a value of 0 when the CAN data frame is a standard CAN data frame with an 11-bit identifier. The IDE bit 606 has a value of 1 when the CAN data frame is an extended CAN data frame.

The DLC 608 indicates the length of the relevant bytes in the CAN frame payload 610. The total length of the payload is 8 bytes; however some CAN data frames may carry fewer than 8 bytes.

The CAN frame payload 610 is 8 bytes long and may contain either raw data, or diagnostic protocol frames encapsulated in a transport frame, as will be explained below.

The CRC field 618 contains a checksum for error detection.

The ACK field 620 is set by nodes receiving an accurate CAN message.

For non-broadcast data that is exchanged between an ECU 110 and a diagnostic tool or a telematics device, a transport protocol is typically used. The transport frames 640 are encapsulated within a CAN data frame 600 in the CAN frame payload 610 thereof. A transport frame 640 is generally comprised of a header and a payload. The header of the transport protocol may contain both a type 642 and a length 644. For example, in the International Standards Organization Transport Protocol (ISO-TP), the upper nibble of byte 0 contains an indication of the type of transport frame. For ISO-TP, a type value of 0 indicates that the transport frame is a single frame and the data encapsulated in the transport payload 646 is all the data being sent. The transport frame 640 is encapsulated in the CAN frame payload 610 of the CAN data frame 600, and the first byte of the transport frame contains a type 642 and a length 644. Accordingly, the payload of the transport payload 646 may hold a maximum of 7 bytes. While this may be sufficient for many data requests, the 7 bytes may not be sufficient for some responses. In that case, the ISO-TP protocol provides for multi-frame transport of data. The first frame of a multi-frame message has a type of 1. Furthermore, the lower nibble of the type 642 and the length 644 contain the full size of the data being sent. In this case, the maximum size of data that can be sent by a multi-frame ISO-TP message is 4095 bytes (0x0FFF). The first frame of a multi-frame message can only carry the first 6 bytes of a multi-frame ISO-TP message. Subsequent frames of a multi-frame message have an upper nibble of 2, and a lower nibble containing a frame number between 0x0 and 0xF starting at 1 and rolling over to 0 after reaching 0xF. A flow control frame that controls whether individual frames are to be acknowledged and a time duration between subsequent frames has a type of 3.

Furthermore, a flow control frame has 2 bytes specifying the flow control and duration. Another variation of the ISO-TP is the BMW-TP which includes an additional byte in byte position 0, the additional byte being the low byte of the response CAN ID that the particular ECU is to use for the response.

Specific diagnostic protocols exist for querying the ECUs 110 requesting specific data or for configuring an ECU in a particular mode. Examples of diagnostic protocols include OnBoard Diagnostic (OBD), Unified Diagnostic Services (UDS) and the keyword protocol (KWP). A diagnostic frame 660 typically has a service identifier (SID) 662 which specifies the diagnostic service requested from an ECU, along with one or more data identifier (DID), such as DID_1 (shown as field 664) and DID_2 (shown as field 666). A diagnostic frame 660 may also contain other data 668. A diagnostic request frame is typically short enough (such as 3 bytes) and may therefore be sent in the transport payload 646 of a single frame transport protocol message. Since the transport payload 646 of a single frame transport message is 7 bytes, the diagnostic request may be 7 bytes long which is generally enough to specify a service, and a number of DIDs. The diagnostic response typically contains more than 7 bytes and therefore is usually spread over a multi-frame transport message.

An ECU 110 may be configured to broadcast asset data pertaining to a device or a subsystem of a vehicle, when the status of the device or subsystem changes. For example, an ECU 110 may place a broadcast CAN data frame on the CAN bus 104 whenever the parking brake changes status from being engaged to being disengaged, and vice versa.

Figure 6B:
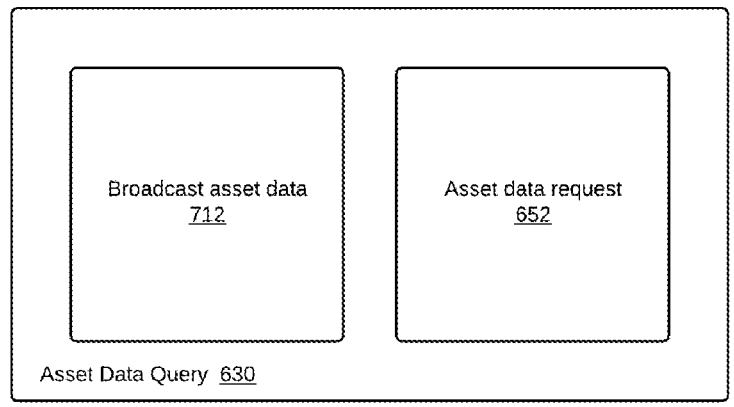
FIG. 6B is a diagram depicting an asset data query.
Figure 6C:
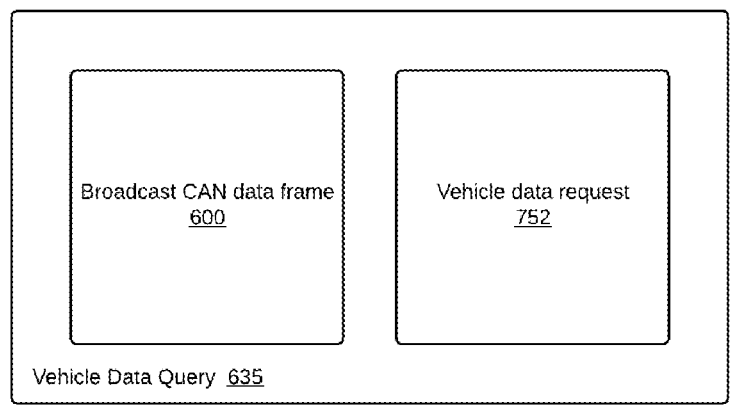
FIG. 6C is a diagram depicting a vehicle data query.

With reference to FIG. 6B and FIG. 6C, in this disclosure, an "asset data query" 630 refers to a telematics device either listening for broadcast asset data 712 containing information or sending an "asset data request" 652. For a vehicle asset, a "vehicle data query" 635 refers to a telematics device either listening for broadcast CAN data frames 600 or sending a "vehicle data request" 752. A vehicle data request 752 may comprise a CAN data frame sent to a particular ECU. The CAN data frame may contain a standardized protocol message encapsulated in a transport protocol or may contain a proprietary protocol message.

Figure 7A:
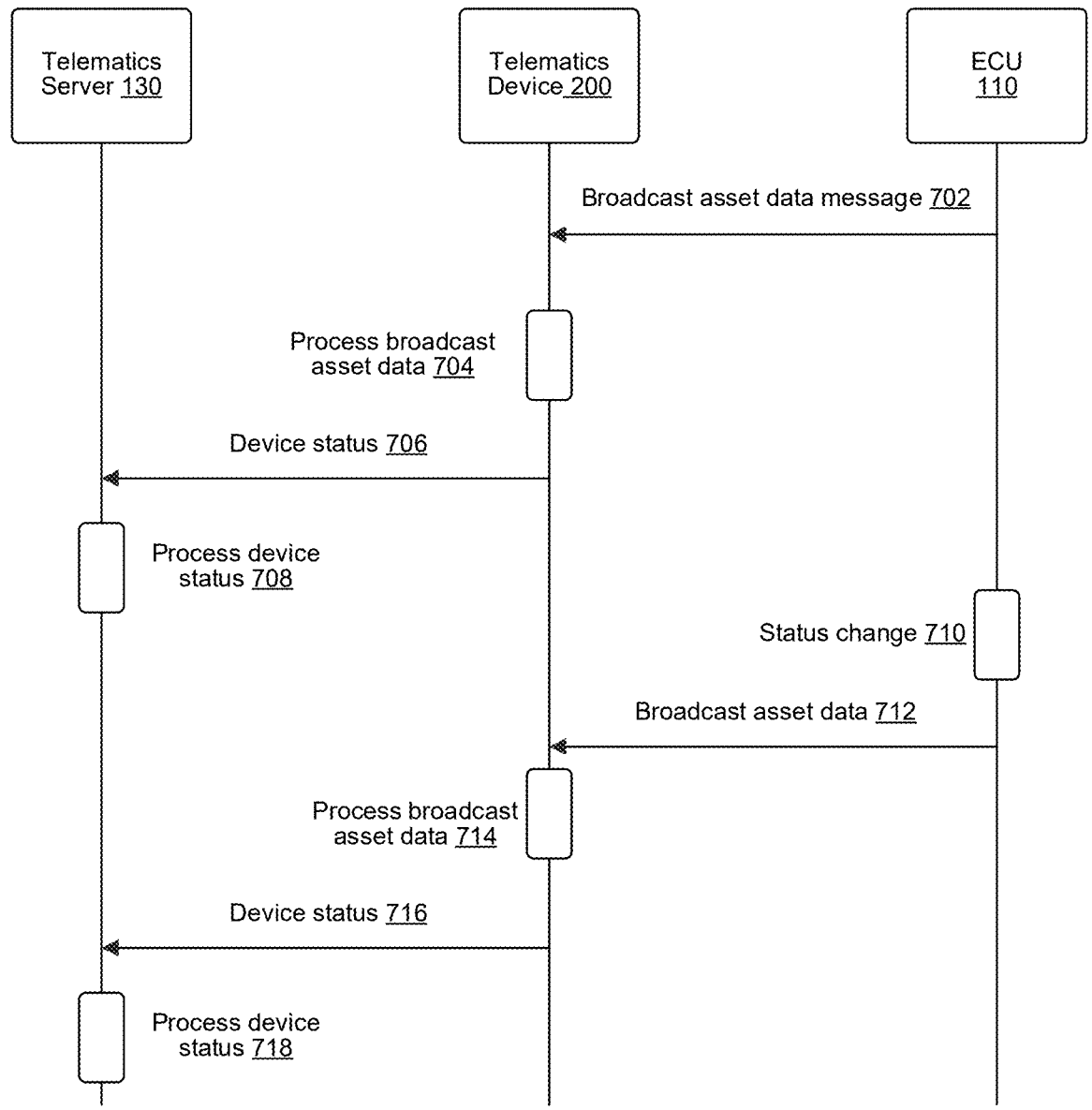
FIG. 7A is a message sequence diagram depicting asset data messages broadcast by an Electronic Control Unit (ECU), captured by a telematics device, and communicated to a telematics server.

As an example, FIG. 7A depicts a message sequence diagram depicting an ECU 110 in communications with a telematics device 200, which in turn is in communication with a telematics server 130. In the depicted example, the status of a device or subsystem coupled to the ECU 110 changes. In response, the ECU 110 broadcasts an asset data message to that effect, as shown in step 702. The broadcast asset data message may be in the form of a broadcast CAN data frame placed on the CAN bus 104. The broadcast asset data message is picked up by the telematics device 200 from the asset communications bus, such as the CAN bus 104.

At step 704, the telematics device 200 processes the broadcast asset data message. For example, the telematics device 200 may examine a broadcast CAN data frame and retrieve a device status therefrom. For example, in a vehicle asset the telematics device 200 may determine that the broadcast CAN data frame contains status data about the current gear that the vehicle is in. Consequently, the telematics device 200 parses and interprets the asset data in the broadcast CAN frame to determine the current gear that the vehicle is in.

At step 706, the telematics device 200 sends the determined device status to the telematics server 130.

At step 708, the telematics server 130 processes the device status. For example, the telematics server 130 may store the device status in the telematics database 132.

Additionally, the telematics server 130 may analyze the device status with respect to other device status information from the telematics device 200.

At step 710, the status of the device or subsystem coupled to the ECU 110 changes.

At step 712, the ECU 110 broadcasts another asset data message, such as a broadcast CAN data frame, similar to step 702.

At step 714, the telematics device 200 processes the broadcast asset data, similar to step 704.

At step 716, the telematics device 200 sends the device status to the telematics server, similar to step 706.

At step 718, the telematics server 130 processes the device's status, similar to step 708.

Request for Device Status

As mentioned above, some ECUs 110 broadcast asset data messages when the status of a corresponding device or subsystem coupled thereto, as discussed above with reference to FIG. 7A. Other ECUs 110 do not broadcast asset data messages and need to be queried for the status data of their corresponding device or subsystem. For example, the telematics device 200 may prepare a CAN data frame containing an asset data request in the form of a diagnostic protocol command requesting information regarding a particular asset parameter. The diagnostic protocol command may include a special identifier or pattern that an ECU 110 recognizes. In response to recognizing the special identifier, the ECU 110 may read the contents of the diagnostic protocol command and determine the requested status data. In response to determining the requested status data, the ECU 110 may provide the requested status data, by placing the requested information on the asset communications bus in the form of an asset data message containing a diagnostic protocol response that contains the requested status data.

Figure 7B:
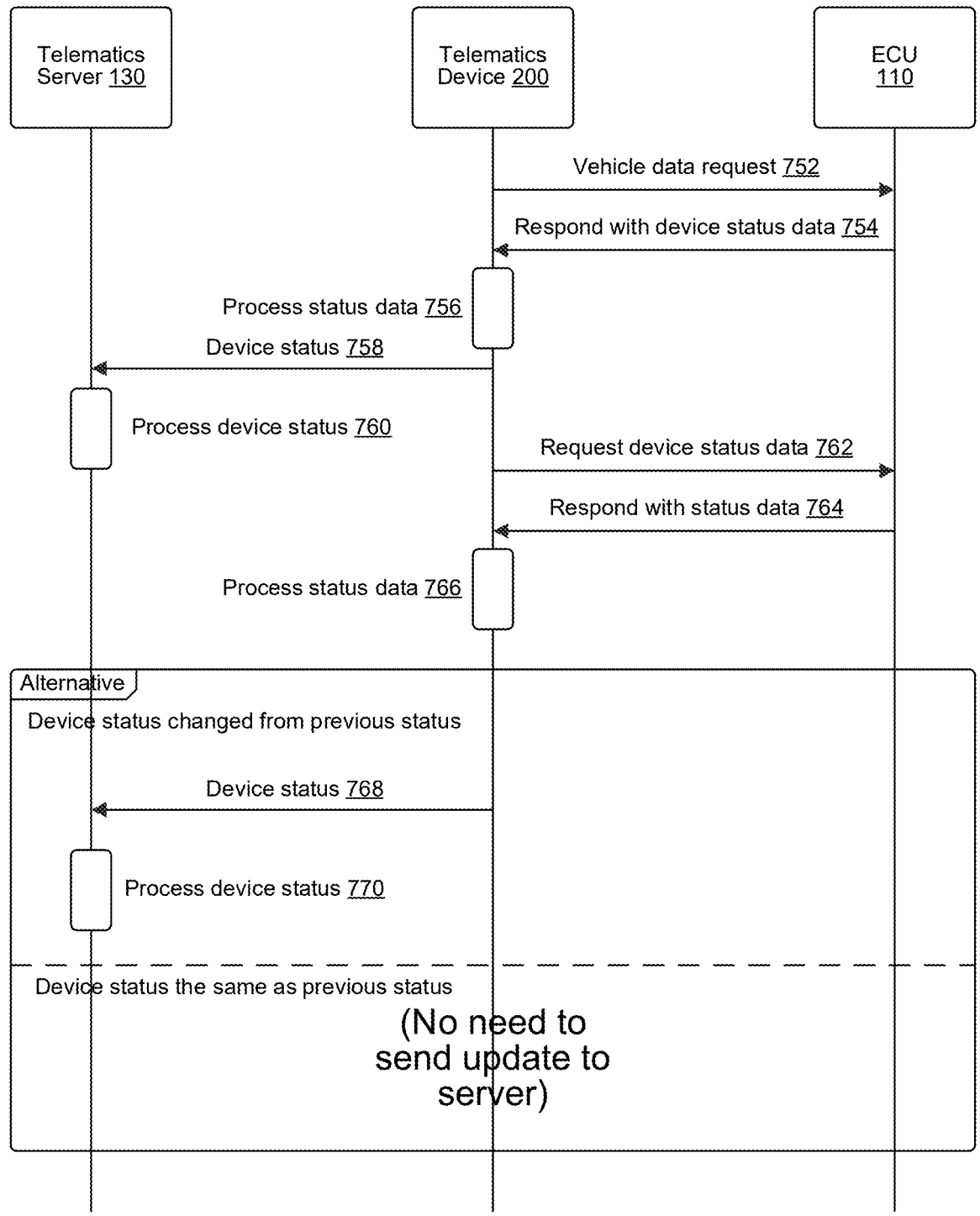
FIG. 7B is a message sequence diagram depicting device status requests made by a telematics device and device status responses captured by a telematics device and communicated to a telematics server.

FIG. 7B depicts a scenario where a telematics device 200 deployed in a vehicle periodically queries an ECU 110 for the status of a device or subsystem coupled thereto, and reports the status to the telematics server 130 whenever there is a change. A detailed description of the protocols used to query the ECU 110 and retrieve information therefrom is beyond the scope of this disclosure. By way of example, the ECU 110 may respond to requests in accordance with the Unified Diagnostic Services (UDS) protocol, the On-Board Diagnostic (OBD) protocol, or the like.

At step 752, the telematics device sends a vehicle data request for device status data to the ECU 110. The request may be in respect of the status of a device or subsystem coupled to the ECU 110. The device status data may be a mode of operation (e.g., gear) or a parameter value (e.g., RPM, or Engine Coolant Temperature (ECT)).

At step 754, the ECU 110 responds with the status data.

At step 756, the telematics device 200 processes the status data and determines a device's status.

At step 758, the telematics device 200 sends the device status to the telematics server 130.

At step 760, the telematics server 130 processes the device status.

The steps 752, 754, 756, 758, and 760 may represent the initial status determination of a device or a subsystem coupled to the ECU 110. For example, the steps 752, 754, 756, 758, and 760 may be executed after the vehicle is turned on to obtain an initial status of the various devices. The steps may be repeated for many of the ECUs 110 to obtain the status of the corresponding devices or subsystems.

Once an initial status of the various devices and subsystems of a vehicle are determined, the telematics device 200 may periodically obtain the status of some device or subsystems by querying the ECUs 110 corresponding to such device or subsystems. Since the telematics server 130 has received the device status of the various devices or subsystems, the telematics device 200 may only send a device status to the telematics server 130 when the device status has changed from a previous value thereof. This is illustrated with reference to steps 762, 764, 766, 768, and 770.

At step 762, the telematics device 200 sends a vehicle data request for status data to the ECU 110, similar to step 752.

At step 764, the ECU 110 responds with the status data, similar to step 754.

At step 766, the telematics device 200 processes the data, similar to step 756.

After step 766, the telematics device 200 compares the device status obtained in step 764 with the previous device status obtained in step 754. If the device status has changed from the previous status, then at step 768, the telematics device 200 sends the new device status to telematics server 130. Then at step 770, the telematics server 130 processes the device status, similar to step 760. If, after step 766, the telematics device 200 determines that the device status obtained in step 764 has not changed from the previous status obtained in step 754, then the telematics device 200 refrains from sending the device status data to the telematics server 130.

Some standardized higher-layer protocols define how the data payloads of CAN data frames are to be translated into asset information that are highly utilized in vehicle telematics (e.g., OBD2, SAE J1939, CANopen). In J1939, for example, vehicle parameters (e.g., speed, tire pressure) are encoded into the data field of a CAN data frame, and are organized by Suspect Protocol Numbers (SPNs), which are expressed as labels in the data fields, and are further organized by Parameter Group Numbers (PGNs), which are expressed as labels in the CAN identifier 602. As an example, as set out in J1939-71 (revised June 2006), the vehicle parameter "wheel-based vehicle speed" is labeled as SPN 84 under PGN 65265, and is expressed in the CAN frame payload 610 of a CAN data frame in 2 bytes of data (providing 2^16=65536 possible combinations of 1s and 0s), with incrementation at 1/256 km/h per bit (incrementing the number by 1 means an increase in 1/256 km/h or 0.00390625 km/h), with 0 offset (i.e., "00000000" means 0 km/h). This formula for deriving a human-intelligible value for "wheel-based vehicle speed" may make up part of a "signal definition". In this disclosure, a signal definition is a set of instructions for obtaining and decoding an asset data message into usable information.

Figure 8:
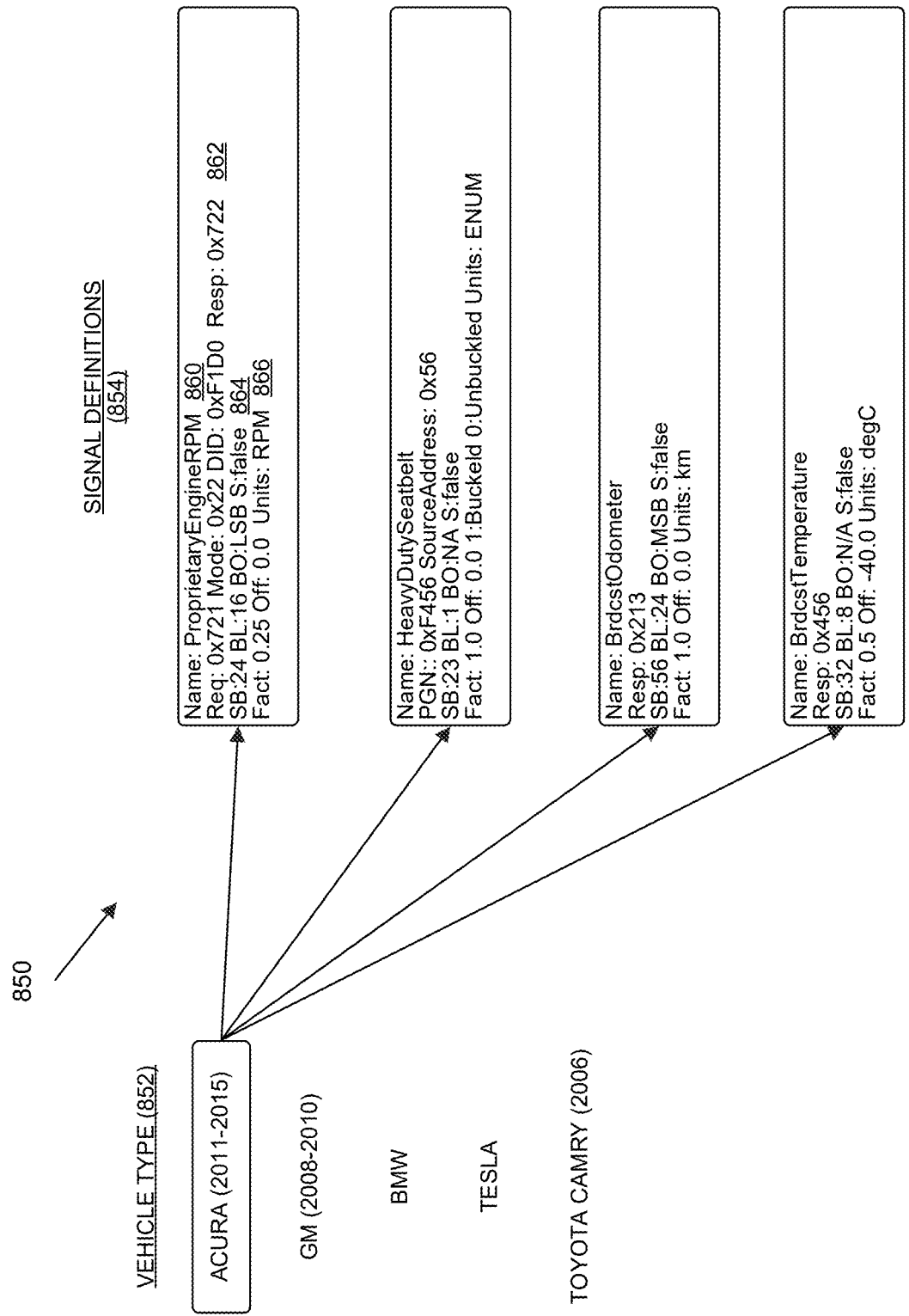
FIG. 8 depicts examples of signal definitions pertaining to various vehicle data parameters for a vehicle type.

FIG. 8 depicts. is a diagram of an example data structure, in the form of the data structure 850 to store signal definitions. The data structure 850 may be understood to be one example of how a signal definition library may be represented. Additionally or alternatively, the data structure 850 may be one example of a local set of signal definitions stored in the memory 240 of the telematics device 200. In the example shown, the data structure 850 contains signal definitions for asset types that are vehicle types, but it is to be understood that data structures that contain signal definitions for other asset types may be arranged similarly.

In the data structure 850, each vehicle type 852 is linked to a set of signal definitions 854 that are to be used to decode (and in some cases, request) asset information from the linked vehicle type 852. Thus, for example, the vehicle type 852 of ACURA (2011-2015) is linked to four signal definitions 854, labeled "ProprietaryEngineRPM", "HeavyDutySeatbelt", "BrdcstOdometer", and "BrdcstTemperature". Each of these signal definitions 854 may be used to obtain a different type of data from an ACURA (2011-2015). For example, RPM may be obtained using the signal definition "ProprietaryEngineRPM" by making a request on 0x721 of 0x0322F1DO, receiving a response back from 0x722, parsing out 16 bits starting at bit 24, in a least-significant byte (LSB) byte order, converting the resulting binary value to decimal, taking into account that the number is an unsigned binary number, multiplying the resulting decimal value by a data scaling factor of 0.25 and applying a data offset of 0.0.

In general, each signal definition 854 includes label data 860 that labels the signal definition (e.g., "Name: ProprietaryEngineRPM"), message protocol data 862 (i.e., messaging instructions) that defines the messaging protocol to solicit/receive the data (e.g., "Req: 0x721 Mode: 0x22 DID: 0xF1D0, Resp: 0x722"), payload identification data 864 (i.e., payload identification instructions) that defines where/how the payload is to be found in a data message (e.g., "SB:24 BL:16 BO: LSB", S: false"), and payload conversion data 866 (i.e., payload conversion instructions) that defines how the payload is to be translated into real-world values (i.e., engineering units, human-intelligible information) (e.g., "Fact: 0.25 Off: 0.0", Units: RPM). The payload conversion data 866 may be referred to as the "formatting characteristics" of the signal definition, as it defines how a data signal is to be formatted when it is plotted and/or converted into a real-world value.

A signal definition may include additional parameters that further define how data is to be obtained from a vehicle. These additional parameters may be made out of necessity (e.g., certain data may only be available during certain times), out of preference (e.g., it may be preferred that certain data be captured at certain times or at certain rates), or for other reasons. For example, a signal definition may define a request interval that defines how often a request for a certain type of data is to be made to the vehicle (e.g., a request for seatbelt status may be made every second whereas a request for odometer may be made every twenty seconds). As another example, a signal definition may define a suitable period of time during which it is appropriate to attempt to obtain information from the vehicle, which may be based on a status of the vehicle, and may further be based on the type of data to be obtained (e.g., battery voltage data may be obtained during vehicle ignition, charging rate data may be obtained while the vehicle is in a "charging" state). Other communication parameters are contemplated.

As mentioned above, a signal definition may only be applicable to one or more particular asset types, and different asset types may use different signal definitions to communicate data of the same data type (e.g., a Ford F-150 may have a different signal definition for odometer than a Honda Civic). However, it should further be noted that in some cases, different asset types may use the same messaging instructions to communicate different data types (e.g., a Ford F-150 may use "Req: 0x721 Mode: 0x22 DID: 0xF1D0, Resp: 0x722" to communicate RPM, but a Honda Civic may communicate engine speed through the same messaging instructions), further highlighting the benefit of maintaining an accurate mapping between asset type fingerprints and signal definitions.

Challenges with Different Vehicle Types

A growing number of vehicles, including electric vehicles (EVs), do not rely on any standardized higher-layer protocol. Even in the case of internal combustion engine (ICE) vehicles, manufacturers are increasingly using proprietary CAN messages for specialized purposes. Thus, it is becoming increasingly difficult to track vehicle information using telematics devices that rely only on standardized protocols to decode CAN messages. Further, memory storage capacity and logistical challenges make it impractical to pre-load every telematics device with the proprietary messaging protocols for decoding CAN messages from every kind of vehicle that the telematics device may be installed in. Moreover, in some cases, the protocols used to decode some proprietary data messages may not be made available from the manufacturer.

In addition, a proprietary asset data message that requests device status data from one ECU in a first vehicle type, may have unintended consequences when received by another ECU in a second vehicle type. As some standard or proprietary asset data messages are used to configure ECUs, a misinterpreted vehicle data request can cause malfunction or unintended operational behavior. Such situations are sometimes termed "engine interference" or more broadly "operation interference", as it may interfere with other components of the powertrain such as the transmission, anti-lock braking systems (ABS), and so on. In this disclosure, operation interference refers to unintended misconfiguration of an ECU as a result of receiving a CAN message that was intended for a different purpose and coincidentally has similar patterns such as the SID, DID_1, and DID_2 as another proprietary asset data message. A vehicle data request that causes operation interference is termed an "error causing vehicle data request". Where possible, an error causing vehicle data request should not be issued on a vehicle that will experience operation interference because of that error causing vehicle data request. It is therefore essential, before sending proprietary and/or non-standard vehicle data requests, to identify the vehicle type of the vehicle in which the telematics device is installed.

It is, however, becoming increasingly difficult for a telematics device to determine, without express indication, what type of vehicle it is installed in, and therefore what set of messaging protocols it is to use to begin collecting information from the vehicle. In earlier times, when the majority of vehicles relied primarily on one of the common standardized higher-layer protocols, a telematics device could be installed in any vehicle, step through a fairly straightforward procedure to determine which of the common standardized protocols the system was installed in, and configure itself to follow the appropriate protocols accordingly. However, with greater and greater deviation from the common standardized protocols (including in jurisdictions in which communication protocol standardization is less prevalent), more sophisticated means of determining the type of vehicle that a telematics device is installed in are required.

Vehicle Category Identification

In this disclosure, we define the concept of a "vehicle category" as a specific example of an asset category for vehicular assets. Further discussion will focus on vehicular assets, but it would be apparent to those skilled in the art that the concepts apply equally to non-vehicle assets. A "vehicle category" is defined as a set of vehicles that share a few specific properties. Specifically, vehicles in a vehicle category produce similar results in response to a set of "category identifying vehicle data queries", provide desired information in response to a set of "information vehicle data queries", and experience operational interference in response to a set of "error causing vehicle data requests". Each of these properties will be described below.

As a simplified example, assume there are only four vehicle categories named c1, c2, c3, and c4.

FIG. 9 shows a main table 900 that includes a plurality of category identifying vehicle data queries a1, a2, a3, a4, a5, a6, a7, a8, a9, and a10 (a1 . . . a10) and the corresponding results of executing each of the category identifying vehicle data queries a1 . . . a10 on four vehicle categories c1, c2, c3, and c4. A "category identifying vehicle data query" comprises either sending a vehicle data request (and receiving an expected vehicle data response) or receiving a broadcast vehicle status (e.g., a broadcast CAN frame). A response of 0 to a particular category identifying vehicle data query indicates that vehicles of the particular vehicle category do not support the particular vehicle data query. In case of a vehicle data query that comprises receiving a particular broadcast data frame, a response of 0 means the status corresponding to the particular type of data is not broadcast (e.g., by the corresponding ECU) of the vehicle, while a response of 1 means that the status is broadcast by the vehicle. In case of a vehicle data request, a response of 0 means that the ECU to which the vehicle data request was sent has not responded to the vehicle data request or sent back a response indicating that the vehicle data request is not supported. A response of 1 to a particular vehicle data request indicates that vehicles of the particular vehicle category support that vehicle data request. Specifically, the ECUs of the particular vehicle category will respond to that particular vehicle data request with an expected response or an indication that the vehicle data request is supported. As an example, vehicles of vehicle category c1 support the category identifying vehicle data queries a1, a3, and a8-a10 as indicated by the result of 1 in the corresponding result column for c1. This means that vehicles belonging to the vehicle category c1 either broadcast or respond to the category identifying vehicle data queries a1, a3, and a8-a10. Vehicles of the vehicle category c2 support the category identifying vehicle data queries a2-a4, and a6-a8. Vehicles of the vehicle category c3 support the category identifying vehicle data queries a3 and a6. Vehicles of the vehicle category c4 support the vehicle data queries a2, a4-a6, and a8-a9. The vehicle data queries utilize the above-mentioned signals of FIG. 8 to parse the asset data messages and extract the queried data either in the broadcast data frames or the vehicle data response frames sent in response to the vehicle data requests. In some implementations, in identifying whether a vehicle belongs to a particular vehicle category, the telematics device may only be interested in whether the category identifying vehicle data queries have worked, and not necessarily the actual data. For example, in determining whether a vehicle belongs to the vehicle category c1, the telematics device may not necessarily be interested in the results of the vehicle data query a9; only whether the vehicle data query a9 has produced a valid result (i.e., a "1" in the row of a9 under the result on c1 column).

Vehicles of the same vehicle category also experience operational interference in response to the same error causing vehicle data requests. In the main table 900 of FIG. 9, such vehicle data requests produce an error, indicated by "E" under the respective columns of the vehicle categories c1-c4. With reference to FIG. 9, vehicles belonging to the vehicle category c1 experience operational interference in response to receiving vehicle data requests a2 and a4. In other words, vehicle data requests a2 and a4 are error causing vehicle data requests for vehicles of vehicle category c1. Vehicles belonging to the vehicle category c2 do not experience any operational interference since none of the results under the results column for c2 contains an "E" . . . . Vehicles belonging to vehicle category c3 experience operational interference in response to receiving vehicle data requests a1, a5, a7, and a10. In other words, vehicle data requests a1, a5, a7, and a10 are error causing vehicle data requests for vehicles of vehicle category c3. Lastly, vehicles belonging to the vehicle category c4 do not experience operational interference in response to any of the vehicle data queries a1 . . . a10 as indicated by the absence of any cells containing "E" in the results column for category c4. It is noted that we refer to error causing vehicle data requests and not error causing vehicle data queries. This stems from the fact that vehicle data queries may comprise sending vehicle data requests or listening for broadcast data. Listening for broadcast data, on a CAN bus for example, does not interfere with the operation of an ECU when the telematics device does not participate on the asset communications bus, such as a CAN bus. The telematics device does not participate when it is in listen-only mode, does not send any error frames, and does not acknowledge any frames placed on the bus by other entities such as ECUs . . . . Thus the only potential error causing types of vehicle data queries are the vehicle data requests. In other words, only error causing vehicle data requests can cause operational interference for different vehicle categories.

Assets belonging to the same asset categories, by definition, provide asset data in response to the same "information asset data queries". Accordingly, a telematics device coupled to an asset of a particular category shall use one or more information asset data queries to obtain asset data from the asset. The same applies to vehicular assets. Vehicles of the same category provide vehicle data in response to the same vehicle data queries. In this disclosure, such vehicle data queries are referred to as "information vehicle data queries". Information vehicle data queries may each be one of: receiving a broadcast frame containing vehicle data, or sending a vehicle data request (e.g., to an ECU) and obtaining information from the vehicle data response sent (by the ECU) in response to the vehicle data request. Either way, the signals of FIG. 8 are utilized to request and/or decode the desired information. FIG. 10 depicts a table 1000 of information vehicle data queries that lists information vehicle data queries that extract core information that is normally required in most vehicles. For example, with reference to FIG. 10, it is assumed that core information for each vehicle comprises odometer, fuel level, ignition status, gear, parking brake status, and seatbelt status. As can be seen in FIG. 10, vehicles belonging to vehicle category c1 provide the desired information in response to the information vehicle data queries a12, a13, a14, a15, a16, and a17 (collectively a first set of information vehicle data queries S1 in FIG. 11). Vehicles belonging to the vehicle category c2 provide the desired information in response to the information vehicle data queries a11, a17, a18, a19, a20, and a21 (collectively a second set of information vehicle data queries S2 in FIG. 11). Vehicles belonging to the vehicle category c3 provide the desired information in response to the information vehicle data queries a11, a13, a23, a24, and a25 (collectively a third set of information vehicle data queries S3 in FIG. 11). Lastly, vehicles belonging to the vehicle category c4 provide the desired information in response to the information vehicle data queries a12, a14, a17, a21, a24, and a25. It is noted that the information vehicle data queries need not be completely different for each vehicle category. In fact it is expected that some vehicle data queries would be used in different vehicle categories to extract either the same information or different information. In the depicted example of FIG. 10, the vehicle data query a17 returns seatbelt information on vehicle category c1 and returns fuel level on both vehicle category c2 and vehicle category c4.

The present disclosure provides a heuristic method for identifying a vehicle category to which a vehicle belongs. The method avoids operational interference and allows for identification of a vehicle category by a telematics device when the telematics device is first coupled to the vehicle via the interface port thereof. Once the vehicle category of a vehicle is identified, the telematics device 200 can execute information vehicle data queries to obtain core vehicle information. The described method may be executed entirely on the telematics device 200, may be executed entirely on the telematics server 130, or may be a hybrid of both.

The method utilizes the main table 900 of category identifying vehicle data queries of FIG. 9. Firstly, at the start of the method, the vehicle category could be any one of the vehicle categories c1, c2, c3, and c4. Accordingly, in order to avoid operation interference, the method first excludes error causing vehicle data requests for all the vehicle categories c1, c2, c3, and c4.

Figures 11, 12A, 12B:
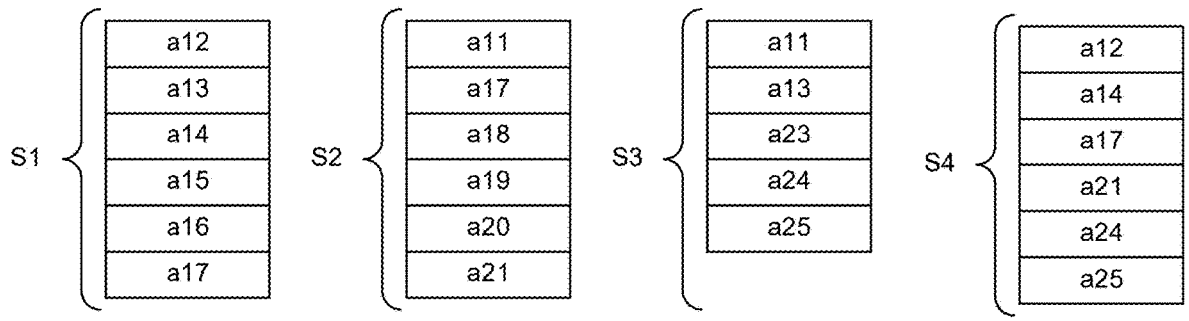
FIG. 11 depicts a plurality of sets of information vehicle data queries each corresponding to a vehicle category of the plurality of vehicle categories.
FIG. 12A depicts the table of FIG. 9 with the rows containing error causing vehicle data requests shaded.
FIG. 12B depicts a temporary table based on the main table of FIG. 9 with the shaded rows in FIG. 12A removed and with a vehicle data query selected for execution identified.

With reference to FIG. 12A, to exclude the error causing vehicle data requests for all possible vehicle categories, all the rows containing an "E" under the result column are identified and are shown shaded.

In the next step of the method, the category identifying vehicle data queries which cause errors are removed. This is a temporary removal since, as will be clear below, some vehicle categories will be excluded after executing a category identifying vehicle data query. As such there will be no reason not to execute a vehicle data request that would cause errors on an excluded category. As such a temporary table 1100 is created, as shown in FIG. 12B. FIG. 12B depicts a temporary table 1100 of category identifying vehicle data queries. The temporary table 1100 is generated from the main table 900 of FIG. 12A, with the shaded rows corresponding to the error causing VDRs removed. Accordingly, the rows corresponding to the vehicle data requests a1, a2, a4, a5, a7, and a10 have not been included in the temporary table 1100.

Figures 13A, 13B, 14:
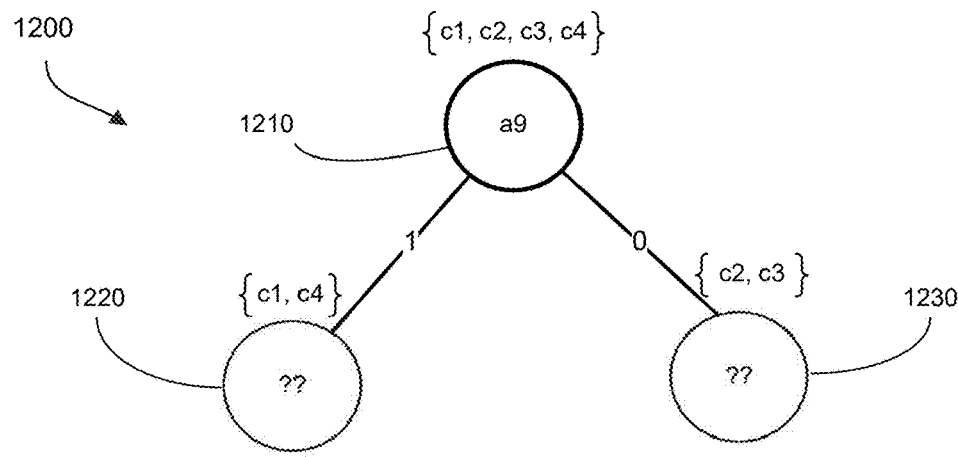
FIG. 13A depicts the main table of FIG. 9 with some columns corresponding to vehicle categories shaded to indicate their imminent removal therefrom as a result of receiving a positive result from executing the vehicle data query selected for execution in FIG. 12B.
FIG. 13B depicts the main table of FIG. 9 with the shaded columns in FIG. 13A removed.
FIG. 14 is a state diagram depicting the outcome of executing the vehicle data query identified in FIG. 12B.

The next step of the method identifies at least one category identifying vehicle data query that can identify one or more vehicle categories. For example, with reference to FIG. 12B, the method includes examining the category identifying vehicle data queries of the temporary table 1100 to identify at least one category identifying vehicle data queries that can identify one or more vehicle categories. From FIG. 12B it is clear that executing the category identifying VDQ "a9" results in positive results (i.e., "1") for vehicle categories c1 and c4 and results in negative results (i.e., "0") for vehicle categories c2 and c3. Assuming that executing the selected vehicle data category "a9" results in a positive result, then the vehicle category of the vehicle to which the telematics device executing the category identifying VDQ "a9" is either of the c1 or c4 vehicle category. Consequently, as shown in FIG. 13A, the method identifies the columns corresponding to c2 as c3 as columns marked for deletion. In FIG. 13B, the columns corresponding to the vehicle categories c2 and c3 have been removed from the table 900.

FIG. 14 depicts a state diagram 1200 representing the state of the vehicle category determination. At state 1210, the vehicle category is not yet known. The set of possible vehicle categories is listed as {c1, c2, c3, c4} to indicate that the vehicle category of the vehicle to which the telematics device 200 is coupled may be any one of these vehicle categories. At the state 1210, the telematics device 200 executes the selected category identifying vehicle data query a9 and checks the response. Executing the category identifying vehicle data query a9 may entail either listening for broadcast data and determining the result based on a signal corresponding to the vehicle data query a9, or may entail sending a vehicle data request based on the signal corresponding to the vehicle data query a9 and processing the response thereto.

When the result of executing the category identifying vehicle data query a9 indicates that the category identifying vehicle data query a9 is supported by the vehicle, the state transitions to the state 1220 indicated by {c1, c4} and the telematics device determines that the vehicle to which the telematics device is coupled belongs to either the vehicle category c1 or the vehicle category c2. The transition from the state 1210 to the state 1220 is labeled 1 to indicate that the result of executing the category identifying vehicle data query a9 indicates that the category identifying vehicle data query a9 is supported.

When the result of executing the selected vehicle data query a9 indicates that the category identifying the vehicle data query a9 is unsupported by the vehicle, the state transitions to the state 1230 indicated by {c2, c3}. In this state, the vehicle category is determined not to be of the vehicle category c1 or the vehicle category c4 and may belong to any one of the remaining (unselected and unchecked) vehicle categories (c2 and c3). The transition is labeled 0 to indicate that the result of executing the category identifying vehicle data query a9 indicates that such a query is not supported by the vehicle.

To determine whether the vehicle category is c1 or c4, the method continues with FIG. 15A. In FIG. 15A, the rows containing error causing vehicle data requests are identified and shaded in the main table 900. In FIG. 15B, a temporary table 1100 is created in which the shaded rows in FIG. 15A are not included. Additionally, a category identifying vehicle data query is selected for execution. For the temporary table 1100 of FIG. 15B it is clear that some category identifying vehicle data queries are not viable for identifying whether the vehicle category is c1 or c4. For example a8 and 19 are both supported on c1 and c4. Of the remaining category identifying vehicle data queries, the VDQ a1 is selected.

When executing the category identifying VDQ a1 returns a positive result, that indicates that the vehicle category is c1. With reference to FIG. 16A, the column containing the results for c4 is shaded. In FIG. 16B the shaded column is removed from the main table 900. Once the main table 900 contains only a single result column corresponding to a vehicle category, then the method is complete and the vehicle category is determined. In this case, the vehicle category is determined to be c1.

When executing the category identifying VDQ a1 returns a negative result, that indicates that the vehicle category is c4. With reference to FIG. 17A, the column containing the results for c1 is shaded. In FIG. 17B the shaded column is removed from the main table 900. Once the main table 900 contains only a single result column corresponding to a vehicle category, then the method is complete and the vehicle category is determined. In this case, the vehicle category is determined to be c4.

Figure 18:
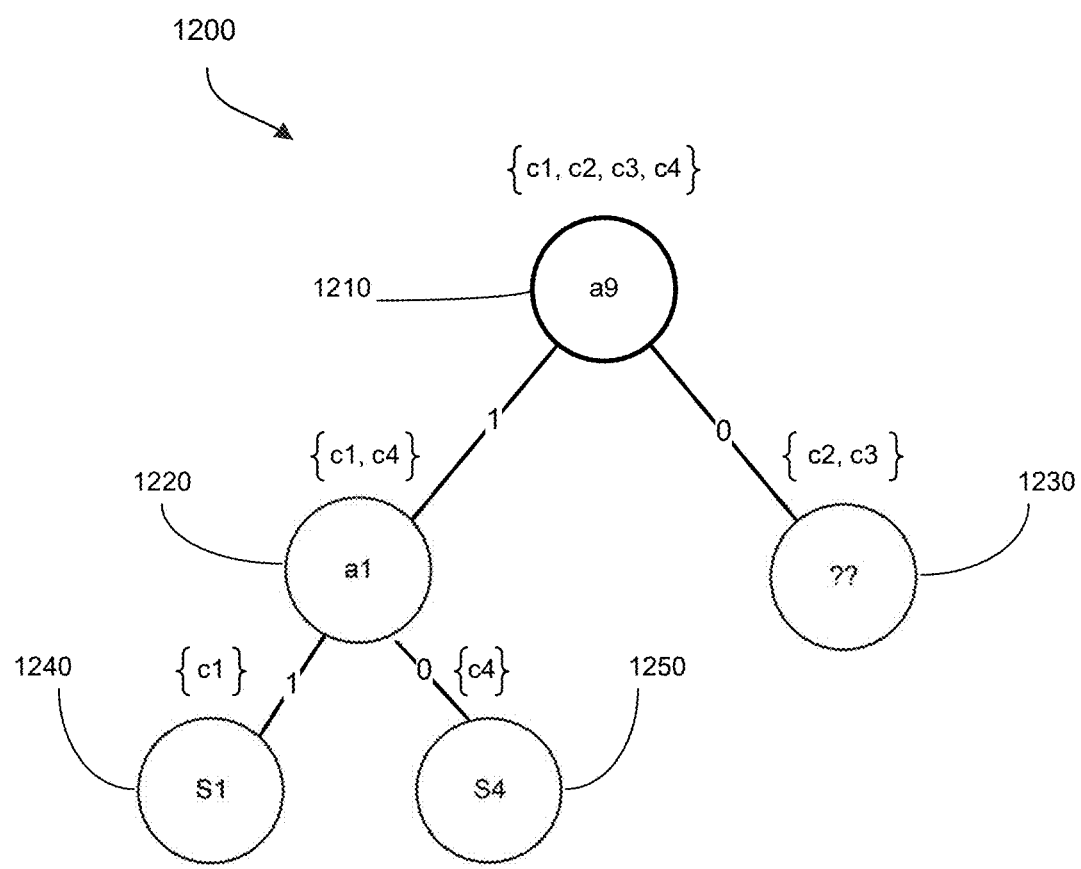
FIG. 18 depicts the state diagram of FIG. 14 with the added states determined by executing the vehicle data query selected in FIG. 15B.

FIG. 18 contains the state diagram 1200 of FIG. 14 with the added state transitions from the state 1220 after executing the query a1. When the result of executing the category identifying VDQ a1 is positive, the new state is 1240 in which the information VDQ S1 can be executed. Conversely, when the result of executing a1 is negative, the new state is 1250 in which the information VDQ S4 can be executed. When the result of executing the query a9 in the state 1210 is a negative result, the new state is 1230. In the state 1230, it is known that the vehicle category is not c1 or c4. Accordingly, as shown in FIG. 19A, the columns containing results for c1 and c4 are shaded in the main table 900. In FIG. 19B, the shaded columns are removed from the main table.

In FIG. 20A, the rows containing error causing VDRs are identified in the main table 900. In FIG. 20B a temporary table 1100 is created in which the shaded rows containing error causing VDRs have been removed. To determine whether the vehicle category is c2 or c3, a category identifying VDQ is selected in the temporary table 1100. For example, the category identifying VDQ a4 is selected and executed.

When the result of executing a4 is positive, the vehicle category is c2. In this case, in FIG. 21A the column corresponding to the vehicle category c3 is marked for deletion. Next, the column corresponding to c3 is deleted from the main table as shown in FIG. 21B.

When the result of executing the category identifying VDQ a4 is negative, the vehicle category is c3. In this case, in FIG. 22A the column corresponding to the vehicle category c2 is marked for deletion. Next, the column corresponding to the vehicle category c2 is deleted from the main table, as shown in FIG. 22B.

The method ends when there is only one column remaining in the main table 900. The vehicle category of the vehicle to which the telematics device 200 is connected is the vehicle category represented by the remaining column in the main table.

Figure 23:
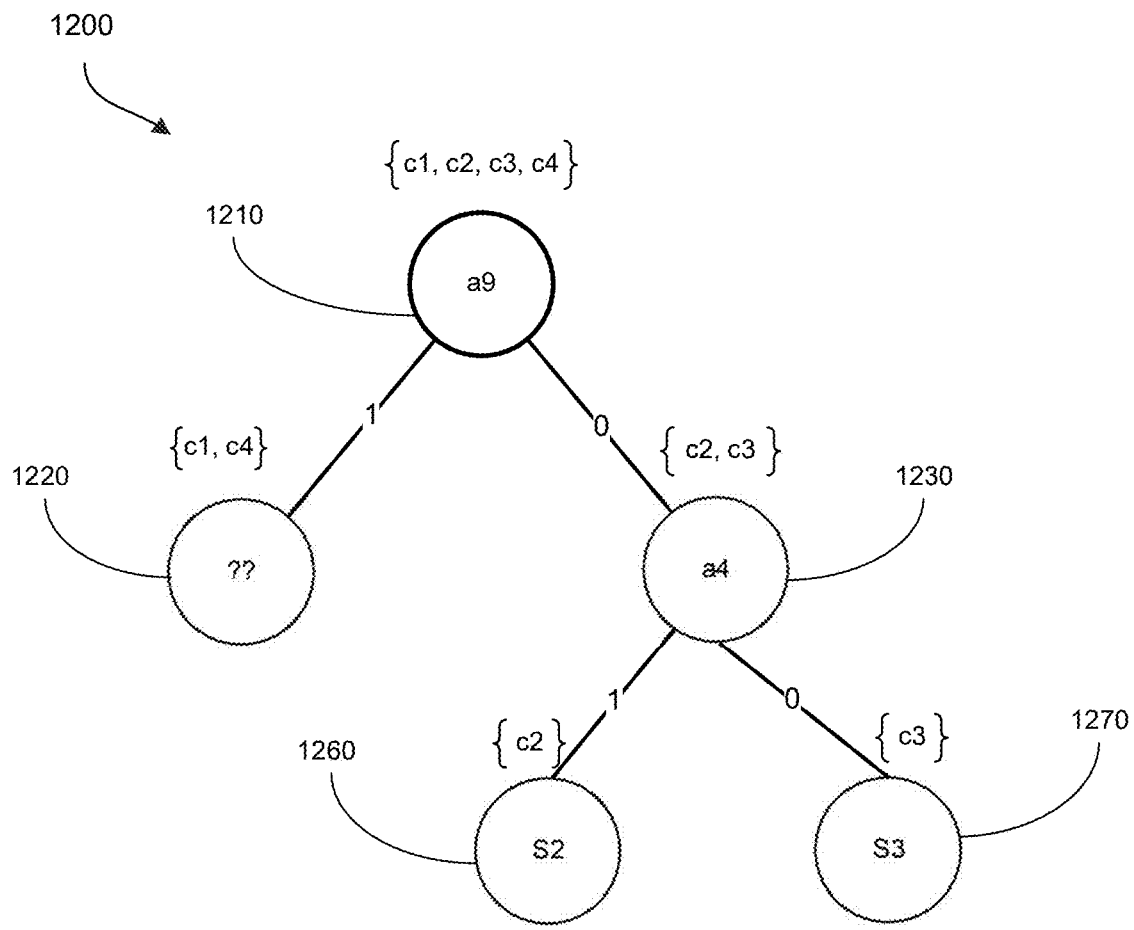
FIG. 23 is the state diagram of FIG. 14 with the added states based on a negative outcome of the vehicle data query selected in FIG. 12B.

FIG. 23 contains the state diagram 1200 of FIG. 14 with the added state transitions from the state 1230 after executing the query a4. When the result of executing the category identifying VDQ a4 is positive, the new state is 1260 in which the information VDQ S2 can be executed. Conversely, when the result of executing a4 is negative, the new state is 1270 in which the information VDQ S3 can be executed.

The steps of a method for identifying a vehicle category of a plurality of vehicle categories as described above may be performed by a telematics device 200, by a telematics server 130, or by a combination of a telematics device 200 and a telematics server 130.

Figure 24:
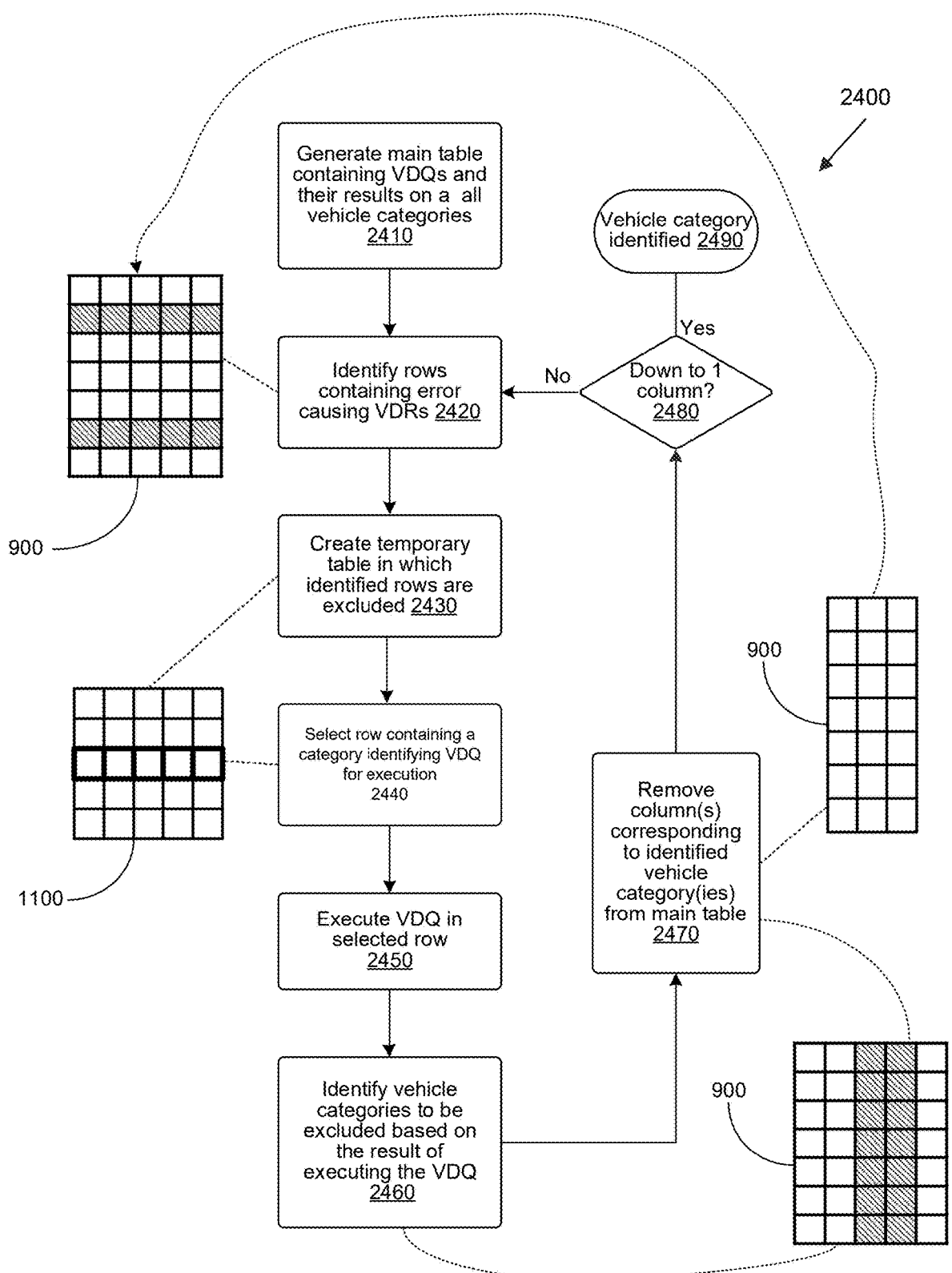
FIG. 24 is a flow diagram for a method for identifying a vehicle category, in accordance with embodiments of the present disclosure.

FIG. 24 depicts a method 2400 for determining a vehicle category for a vehicle to which a telematics device 200 is connected.

The method 2400, when executed by a telematics device 200, assumes that the telematics device 200 has access to a main table 900, which comprises a plurality of rows each row containing a category identifying vehicle data query and corresponding expected results of executing the category identifying vehicle data query on each vehicle category of the plurality of vehicle categories. The expected results are thus organized in columns of the main table 900. The main table 900 is generated at the telematics server 130 based on data gathered from thousands of vehicles over many years. The gathered data includes category identifying vehicle data queries, information vehicle data queries, and error causing vehicle data requests for a plurality of vehicle categories.

The method 2400, when executed by the telematics server 130 assumes that executing a vehicle data query comprises sending the vehicle data query to the telematics device 200 and receiving the result of executing the vehicle data query back from the telematics device 200.

The method 2400 begins at step 2410. In step 2410, a main table 900 comprised of a plurality of rows, each row including a vehicle data query and the results of executing such vehicle data query on a plurality of vehicle categories represented by table columns. The main table 900 is generated at the telematics server 130 based on vehicle data gathered over a long period of time and stored in a telematics database 132. If the method 2400 is executed by the telematics device 200 then the step 2410 comprises receiving the main table 900 from the telematics server 130 over the air. In some embodiments, the main table 900 is provided in a storage module when the telematics device 200 is manufactured. However, providing the main table 900 over the air has the advantage of providing the telematics device 200 with a most updated main table 900.

At the outset, the main table 900 has rows containing the results of executing a plurality of queries on a plurality of vehicle categories. When executing a VDQ on a vehicle category produces a positive result, the result is listed as '1' under the column of such vehicle category. When executing a VDQ on a vehicle category produces a negative result, the result is listed as '0' under the column of such vehicle category. Some of the results are specified as errors designated by the letter 'E' as shown in FIG. 9. Accordingly, when selecting a vehicle data query for executions such queries have to be avoided in order to avoid causing an error (operational interference). Accordingly, at step 2420 all rows containing error results on any vehicle category are identified and are shown shaded in the figure.

At step 2430, the method creates a temporary table 1100 which is a copy of the main table 900 but in which all the rows containing error results are excluded.

At step 2440, the method selects a row containing a category identifying vehicle data query for execution. As discussed above some factors are considered when selecting the category identifying vehicle data query. These factors include the vehicle categories for which the selected category identifying vehicle data query produces a positive result, and the number of vehicles deployed belonging to a vehicle category of the vehicle categories that produce a positive result. By selecting such a query, the probability of receiving a positive result when executing the category identifying VDQ is relatively high, which may lead to fewer steps until the vehicle category of the vehicle to which the telematics device 200 is coupled is determined.

At step 2450, the category identifying VDQ of the selected row is executed by the telematics device.

At step 2460, the result of executing the category identifying VDQ of the selected row is examined. If the result is positive, then vehicle categories known to produce a negative result for the executed category identifying VDQ are identified for removal from the table. Conversely, if the result is negative, then vehicle categories known to produce a positive result for the executed category identifying VDQ are identified for removal from the main table 900. The table columns containing the category identifying VDQs identified for removal are shown as shaded.

At step 2470, the table columns corresponding to the vehicle categories identified for removal, are removed. The main table 900 is shown with fewer columns after the shaded columns are removed.

When the table 900 has only 1 column corresponding to one vehicle category, then the vehicle category of the vehicle coupled to the telematics device 200 is identified as that one vehicle category. Accordingly, at step 2480, the method checks if the main table 900 is now down to a single column containing results of executing queries on a vehicle category. When the main table 900 contains one vehicle category, the method ends at step 2490. When the main table 900 contains more than one vehicle category, then the method continues with step 2420.

Thus the steps 2420 to 2480 are repeated with the main table 900 losing at least one column with each iteration, until there is only one column containing a vehicle category's results of execution of the queries in the respective rows of the main table 900. At that point, at step 2490 the method determines the vehicle category to be that corresponding to the remaining one column.

Once the vehicle category is determined, the telematics device 200 selects information vehicle data queries for obtaining information from the vehicle. In some cases, executing the information VDQs includes the telematics device 200 listening for broadcast data frames on the asset communications bus via the interface port. In other cases, executing the information VDQs includes sending VDRs to one or more ECU on the asset communications bus via the interface port and decoding the received vehicle data responses.

While the method 2400 has represented the category identifying vehicle data queries and corresponding expected results of executing the category identifying vehicle query on a plurality of vehicle categories in the main table 900, the method is not limited by such representation of the data. For example, the list of category identifying vehicle data queries and the corresponding expected results may be stored in a linked list, a two dimensional array, an array of structures, or any other suitable data structure.

Advantageously, a telematics device 200 can be plugged into a vehicle of an unknown type and can select the appropriate vehicle data queries that retrieves desired vehicle data without causing operational interference. In general, a telematics device 200 can be plugged into any asset 100, determine an asset category, and based on the asset category execute asset data queries for obtaining asset data without causing operational interference.

Figure 25:
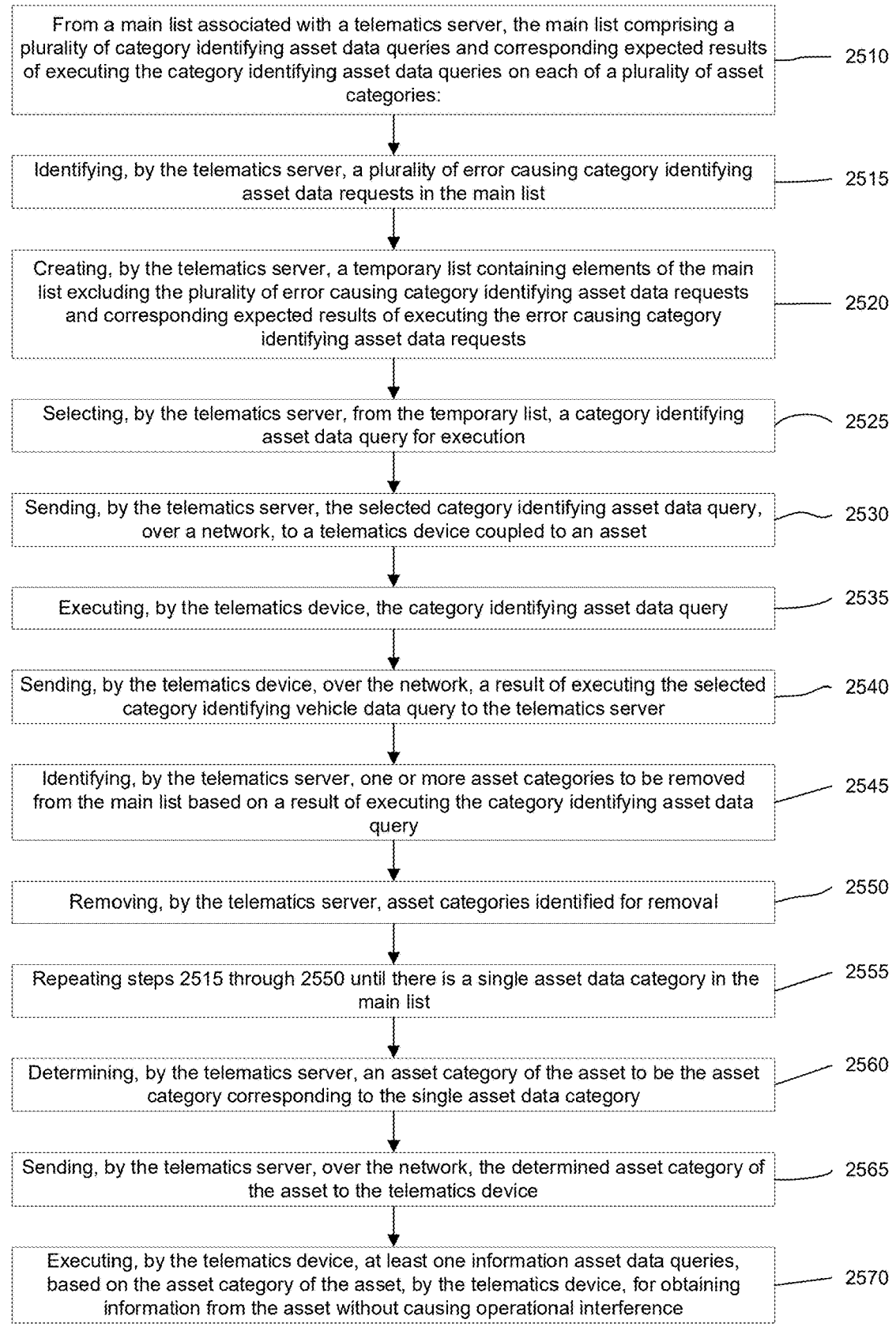
FIG. 25 is a flowchart for a method for identifying an asset category, in accordance with embodiments of the present disclosure.

The aforementioned method can be generalized to any asset to which a telematics device is coupled. By way of example, FIG. 25 depicts a method 2500 in a telematics system. Some steps of the method 2500 are performed by a telematics server while other steps are performed by a telematics device, as specified below.

At 2510, the context is defined for the method. Specifically, 510 indicates that the method is applied to a main list associated with a telematics server 130. The main list comprises a plurality of category identifying asset data queries and corresponding expected results of executing the category identifying asset data queries on each of a plurality of asset categories. The steps 2515 through 2550 apply to the main list.

At step 2515, the telematics server 130 identifies a plurality of error causing category identifying asset data requests in the main list.

At step 2520, the telematics server creates a temporary list containing elements of the main list excluding the plurality of error causing category identifying asset data requests and corresponding expected results of executing the error causing category identifying asset data requests.

At step 2525, the telematics server 130 selects a category identifying asset data query for execution, from the temporary list created in step 2520.

At step 2530, the telematics server 130 sends the selected category identifying asset data query, over a network 50, to a telematics device 200 coupled to an asset 100.

At step 2535, the selected category identifying asset data query is executed by a telematics device 200.

At step 2540, the telematics device 200 sends, over the network 50, a result of executing the selected category identifying vehicle data query to the telematics server 130.

At step 2545, the telematics server 130 identifies one or more asset categories to be removed from the main list based on a result of executing the category identifying asset data query.

For example, asset categories known to produce a positive result with the selected category identifying asset data query, are identified for removal from the main list when the selected asset data query returns a negative result. Conversely, asset categories known to produce a negative result with the selected category identifying asset data query, are identified for removal from the main list when the selected category identifying asset data query returns a positive result.

At step 2550, the telematics server 130 removes asset data categories identified for removal from the main list.

At step 2555, when the main list has a single asset data category left, then the method ends and the single asset data category is determined to be the asset category of the asset coupled to the telematics device. When the main list has more than one asset data category, the step 2515 to the step 2550 are repeated.

At step 2560, the telematics server 130 determines an asset category of the asset to be the asset category corresponding to the single asset data category that is left in the main list.

At step 2565, the telematics server 130 sends the determined asset category of the asset 100 to the telematics device 200, over the network 50.

At step 2570, the telematics device 200 executes at least one information asset data queries, based on the asset category of the asset, by the telematics device, for obtaining information from the asset without causing operational interference.

Figure 26:
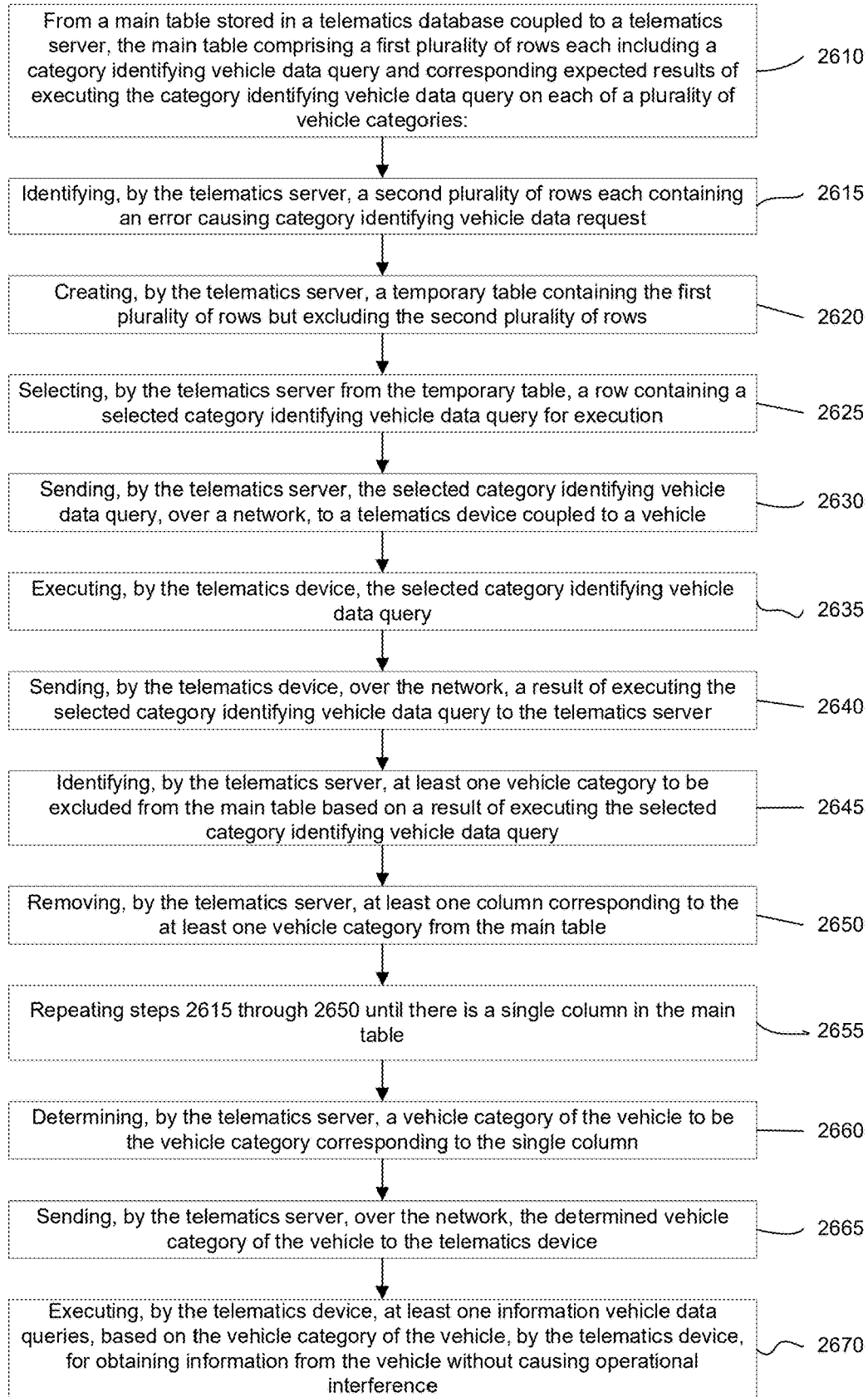
FIG. 26 is a flowchart for a method for identifying a vehicle category, in accordance with embodiments of the present disclosure.

FIG. 26 depicts a method, in a telematics system 101, the method for identifying a vehicle category. The method applies in the context of a main table 900 stored in a telematics database coupled to a telematics server, the main table 900 comprising a first plurality of rows each including a category identifying vehicle data query and corresponding expected results of executing the category identifying vehicle data query on each of a plurality of vehicle categories, as indicated in step 2610 of the method.

At step 2615, the telematics server 130 identifies a second plurality of rows each containing an error causing category identifying vehicle data request.

At step 2620, the telematics server 130 creates a temporary table 1100 containing the first plurality of rows but excluding the second plurality of rows.

At step 2625, the telematics server selects 130 from the temporary table 1100 a row containing a selected category identifying vehicle data query for execution.

At step 2630, the telematics server 130 sends the selected category identifying vehicle data query, over a network, to a telematics device coupled to a vehicle.

At step 2635, the telematics device 200 executes the selected category identifying vehicle data query.

At step 2640, the telematics device 200 sends, over the network 50, a result of executing the selected category identifying vehicle data query to the telematics server 130.

At step 2645, the telematics server 130 identifies at least one vehicle category to be excluded from the main table 900 based on a result of executing the selected category identifying vehicle data query.

At 2650, the telematics server 130 removes at least one column corresponding to the at least one vehicle category from the main table 900.

At step 2655, the steps 2615 through 2650 are repeated there is a single column in the main table 900.

At step 2660, the telematics server 130 determines a vehicle category of the vehicle to be the vehicle category corresponding to the single column.

At step 2665, the telematics server 130 sends the determined vehicle category of the vehicle to the telematics device 200.

At step 2670, the telematics device 200 executes at least one information vehicle data queries, based on the vehicle category of the vehicle, by the telematics device, for obtaining information from the vehicle without causing operational interference.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A method in a telematics system, comprising:
from a main list associated with a telematics server, the main list comprising a plurality of category identifying asset data queries and corresponding expected results of executing the category identifying asset data queries on each of a plurality of asset categories:
i) identifying, by the telematics server, a plurality of error causing category identifying asset data requests in the main list;
ii) creating, by the telematics server, a temporary list containing elements of the main list excluding the plurality of error causing category identifying asset data requests and corresponding expected results of executing the error causing category identifying asset data requests;
iii) selecting, by the telematics server, from the temporary list, a category identifying asset data query for execution;
iv) sending, by the telematics server, the selected category identifying asset data query, over a network, to a telematics device coupled to an asset and physically coupled to an asset communications bus;
v) executing, by the telematics device, the category identifying asset data query by capturing, in real time, electrical messages emitted by one or more electronic control units, ECUs on the asset communications bus, wherein the asset data comprises at least one of engine revolutions-per-minute, RPM, battery voltage, fuel level, tire pressure, oil temperature, or other data available through an interface port of the asset;
vi) sending, by the telematics device, over the network, a result of executing the selected category identifying vehicle data query to the telematics server;
vii) identifying, by the telematics server, one or more asset categories to be removed from the main list based on a result of executing the category identifying asset data query;
viii) removing, by the telematics server, asset categories identified for removal; and
ix) repeating steps i) through viii) until there is a single asset data category in the main list;
determining, by the telematics server, an asset category of the asset to be the asset category corresponding to the single asset data category;
sending, by the telematics server, over the network, the determined asset category of the asset to the telematics device; and
executing, by the telematics device, at least one information asset data queries, based on the asset category of the asset, by the telematics device, for obtaining information from the asset without causing operational interference by listening for broadcast data messages or placing asset data requests on the asset communications bus, wherein the telematics device obtains the asset data via an asset interface comprising a Controller Area Network, CAN transceiver from the interface port of the asset.

2. The method of claim 1, wherein identifying the plurality of error causing category identifying asset data requests in the main list comprises identifying category identifying asset data queries each having a corresponding expected result of executing that indicates an error.

3. The method of claim 1, further comprising sending, by the telematics device, the obtained information to the telematics server.

4. The method of claim 1, wherein executing the selected category identifying asset data query by the telematics device comprises listening for broadcast data messages on an asset communications bus of the asset, wherein the broadcast data messages comprise CAN data frames placed on the bus by one or more ECUs.

5. The method of claim 1, wherein executing the selected category identifying asset data query by the telematics device comprises placing an asset data request on an asset communications bus of the asset and receiving an asset data response corresponding to the asset data request, wherein the asset data request is sent in a CAN data frame to an ECU and the response is received in a CAN data frame.

6. A method in a telematics system, comprising:
from a main table stored in a telematics database coupled to a telematics server, the main table comprising a first plurality of rows each including a category identifying vehicle data query and corresponding expected results of executing the category identifying vehicle data query on each of a plurality of vehicle categories:
i) identifying, by the telematics server, a second plurality of rows each containing an error causing category identifying vehicle data request;
ii) creating, by the telematics server, a temporary table containing the first plurality of rows but excluding the second plurality of rows;
iii) selecting, by the telematics server from the temporary table, a row containing a selected category identifying vehicle data query for execution;
iv) sending, by the telematics server, the selected category identifying vehicle data query, over a network, to a telematics device coupled to a vehicle and physically coupled to an asset communications bus, wherein the asset data comprises at least one of engine revolutions-per-minute (RPM), battery voltage, fuel level, tire pressure, oil temperature, or other data available through an interface port of the asset;
v) executing, by the telematics device, the selected category identifying vehicle data query by capturing, in real time, electrical messages emitted by one or more ECUs on the asset communications bus;
vi) sending, by the telematics device, over the network, a result of executing the selected category identifying vehicle data query to the telematics server;
vii) identifying, by the telematics server, at least one vehicle category to be excluded from the main table based on a result of executing the selected category identifying vehicle data query;
viii) removing, by the telematics server, at least one column corresponding to the at least one vehicle category from the main table; and
ix) repeating steps i) through viii) until there is a single column in the main table;
determining, by the telematics server, a vehicle category of the vehicle to be the vehicle category corresponding to the single column;
sending, by the telematics server, over the network, the determined vehicle category of the vehicle to the telematics device; and
executing, by the telematics device, at least one information vehicle data queries, based on the vehicle category of the vehicle, by the telematics device, for obtaining information from the vehicle without causing operational interference by listening for broadcast data messages or placing vehicle data requests on the asset communications bus, wherein the telematics device obtains the asset data via an asset interface comprising a CAN transceiver from the interface port of the asset.

7. The method of claim 6, wherein identifying the second plurality of rows comprises identifying rows wherein the corresponding expected results of executing the category identifying vehicle data query indicates an error.

8. The method of claim 6, further comprising sending, by the telematics device, the obtained information to the telematics server.

9. The method of claim 6, wherein executing the selected category identifying vehicle data query by the telematics device comprises listening for broadcast data messages on an asset communications bus of the vehicle, wherein the broadcast data messages comprise CAN data frames placed on the bus by one or more ECUs.

10. The method of claim 6, wherein executing the selected category identifying vehicle data query by the telematics device comprises placing a vehicle data request on an asset communications bus of the vehicle and receiving a vehicle data response corresponding to the vehicle data request, wherein the vehicle data request is sent in a CAN data frame to an ECU and the response is received in a CAN data frame.

11. A telematics system, comprising:
a telematics server;
a telematics database coupled to the telematics server;
a network; and
a telematics device in communication with the telematics server over the network and physically coupled to an asset communications bus;
wherein from a main list associated with a telematics server, the main list comprising a plurality of category identifying asset data queries and corresponding expected results of executing the category identifying asset data queries on each of a plurality of asset categories:
i) the telematics server identifies a plurality of error causing category identifying asset data requests in the main list;
ii) the telematics server creates a temporary list containing elements of the main list excluding the plurality of error causing category identifying asset data requests and corresponding expected results of executing the error causing category identifying asset data requests;
iii) the telematics server selects from the temporary list, a category identifying asset data query for execution;
iv) the telematics server sends the selected category identifying asset data query, over a network, to a telematics device coupled to an asset and physically coupled to an asset communications bus;
v) the telematics device executes the category identifying asset data query by capturing, in real time, electrical messages emitted by one or more ECUs on the asset communications bus, wherein the asset data comprises at least one of engine revolutions-per-minute (RPM), battery voltage, fuel level, tire pressure, oil temperature, or other data available through an interface port of the asset;
vi) the telematics device sends over the network, a result of executing the selected category identifying vehicle data query to the telematics server;

vii) the telematics server identifies one or more asset categories to be removed from the main list based on a result of executing the category identifying asset data query;

viii) the telematics server removes asset categories identified for removal; and ix) the steps i) through viii) are repeated until there is a single asset data category in the main list;

telematics server determines an asset category of the asset to be the asset category corresponding to the single asset data category;

the telematics server sends, over the network, the determined asset category of the asset to the telematics device; and the telematics device executes at least one information asset data queries, based on the asset category of the asset, by the telematics device, for obtaining information from the asset without causing operational interference by listening for broadcast data messages or placing asset data requests on the asset communications bus, wherein the telematics device obtains the asset data via an asset interface comprising a CAN transceiver from the interface port of the asset.

12. The telematics system of claim 11, wherein the telematics device sends the obtained information to the telematics server.

13. The telematics system of claim 11, wherein the telematics device executes the selected category identifying vehicle data query by listening for broadcast data messages on an asset communications bus of the vehicle, wherein the broadcast data messages comprise CAN data frames placed on the bus by one or more ECUs.

14. The telematics system of claim 11, wherein the telematics device executes the selected category identifying vehicle data query by placing an asset data request on an asset communications bus of the asset and receiving an asset data response corresponding to the asset data request, wherein the asset data request is sent in a CAN data frame to an ECU and the response is received in a CAN data frame.

15. The telematics system of claim 11, wherein the telematics server identifies the second plurality of rows by identifying rows wherein the corresponding expected results of executing the category identifying vehicle data query indicates an error.

\* \* \* \* \*